(12) United States Patent
Srinivasan et al.

(10) Patent No.: US 9,191,581 B2
(45) Date of Patent: *Nov. 17, 2015

(54) METHODS AND APPARATUS FOR MIXING COMPRESSED DIGITAL BIT STREAMS

(71) Applicant: The Nielsen Company (US), LLC, New York, NY (US)

(72) Inventors: Venugopal Srinivasan, Tarpon Springs, FL (US); John C. Peiffer, New Port Richey, FL (US)

(73) Assignee: The Nielsen Company (US), LLC, New York, NY (US)

( * ) Notice: Subject to any disclaimer, the term of this patent is extended or adjusted under 35 U.S.C. 154(b) by 218 days.

This patent is subject to a terminal disclaimer.

(21) Appl. No.: 13/800,249

(22) Filed: Mar. 13, 2013

(65) Prior Publication Data

US 2013/0194507 A1 Aug. 1, 2013

Related U.S. Application Data

(63) Continuation of application No. 11/571,483, filed as application No. PCT/US2005/023578 on Jun. 29, 2005, now Pat. No. 8,412,363.

(60) Provisional application No. 60/586,354, filed on Jul. 8, 2004, provisional application No. 60/585,115, filed on Jul. 2, 2004.

(51) Int. Cl.
*G06F 17/00* (2006.01)
*H04N 5/265* (2006.01)
(Continued)

(52) U.S. Cl.
CPC .............. *H04N 5/265* (2013.01); *G10L 19/173* (2013.01); *G11B 20/00007* (2013.01);
(Continued)

(58) Field of Classification Search
CPC ............... G06T 2201/0051; G06T 2201/0052; G06T 2201/0061; G06T 1/005; H04N 1/32187; H04N 21/23892; H04N 21/8358; H04N 2201/327
USPC ......... 700/94; 382/100, 232, 240; 380/51, 54, 380/201, 210, 252, 287; 370/522–529
See application file for complete search history.

(56) References Cited

U.S. PATENT DOCUMENTS 4,675,750 A 6/1987 Collins et al.
5,161,210 A 11/1992 Druyvesteyn et al.
(Continued)

FOREIGN PATENT DOCUMENTS

AU 2004258470 1/2005
AU 2005270105 2/2006
(Continued)

OTHER PUBLICATIONS

Abdulaziz et al., "Wavelet Transform and Channel Coding for Data Hiding in Video," Department of Electrical and Computer Systems Engineering, Monash University, Clayton, Australia, 2001 (5 pages).

(Continued)

*Primary Examiner* — Andrew C Flanders
(74) *Attorney, Agent, or Firm* — Hanley, Flight & Zimmerman, LLC

(57) ABSTRACT

Methods, apparatus and articles of manufacture for mixing compressed digital bit streams are disclosed. An example method disclosed herein comprises acquiring a frame associated with a first compressed digital bit stream, unpacking the frame to obtain a plurality of original transform coefficient sets, and modifying the plurality of original transform coefficient sets to mix a second digital bit stream with the first compressed digital bit stream.

21 Claims, 12 Drawing Sheets

(51) Int. Cl.
*G10L 19/16* (2013.01)
*G11B 20/00* (2006.01)
*G11B 20/10* (2006.01)
*G11B 27/034* (2006.01)
*G10L 19/008* (2013.01)
*G10L 19/032* (2013.01)

(52) U.S. Cl.
CPC ....... *G11B 20/10527* (2013.01); *G11B 27/034* (2013.01); *G10L 19/008* (2013.01); *G10L 19/032* (2013.01); *G11B 2020/00028* (2013.01); *G11B 2020/00036* (2013.01); *G11B 2020/10546* (2013.01)

(56) References Cited

U.S. PATENT DOCUMENTS

| | | |
|---|---|---|
| 5,319,453 A | 6/1994 | Copriviza et al. |
| 5,349,549 A | 9/1994 | Tsutsui |
| 5,450,490 A | 9/1995 | Jensen et al. |
| 5,455,630 A | 10/1995 | McFarland et al. |
| 5,479,299 A | 12/1995 | Matsumi et al. |
| 5,490,170 A | 2/1996 | Akagiri et al. |
| 5,493,339 A | 2/1996 | Birch et al. |
| 5,532,732 A | 7/1996 | Yuen et al. |
| 5,539,471 A | 7/1996 | Myhrvold et al. |
| 5,574,952 A | 11/1996 | Brady et al. |
| 5,583,562 A | 12/1996 | Birch et al. |
| 5,588,022 A | 12/1996 | Dapper et al. |
| 5,598,228 A | 1/1997 | Saitoh |
| 5,600,366 A | 2/1997 | Schulman |
| 5,621,471 A | 4/1997 | Kim et al. |
| 5,625,418 A | 4/1997 | Binder et al. |
| 5,649,054 A | 7/1997 | Oomen et al. |
| 5,675,610 A | 10/1997 | Chinen |
| 5,677,980 A | 10/1997 | Naoe |
| 5,682,463 A | 10/1997 | Allen et al. |
| 5,687,191 A | 11/1997 | Lee et al. |
| 5,708,476 A | 1/1998 | Myhrvold et al. |
| 5,724,091 A | 3/1998 | Freeman et al. |
| 5,727,092 A | 3/1998 | Sandford, II et al. |
| 5,734,429 A | 3/1998 | Jung |
| 5,739,864 A | 4/1998 | Copeland |
| 5,739,866 A | 4/1998 | Kim et al. |
| 5,745,184 A | 4/1998 | Neal |
| 5,748,783 A | 5/1998 | Rhoads |
| 5,764,763 A | 6/1998 | Jensen et al. |
| 5,768,426 A | 6/1998 | Rhoads |
| 5,778,096 A | 7/1998 | Stearns |
| 5,778,102 A | 7/1998 | Sandford, II et al. |
| 5,801,782 A | 9/1998 | Patterson |
| 5,808,689 A | 9/1998 | Small |
| 5,848,155 A | 12/1998 | Cox |
| 5,852,800 A | 12/1998 | Modeste et al. |
| 5,867,819 A | 2/1999 | Fukuchi et al. |
| 5,870,754 A | 2/1999 | Dimitrova et al. |
| 5,905,800 A | 5/1999 | Moskowitz et al. |
| 5,915,027 A | 6/1999 | Cox et al. |
| 5,917,830 A | 6/1999 | Chen et al. |
| 5,930,369 A | 7/1999 | Cox et al. |
| 6,029,045 A | 2/2000 | Picco et al. |
| 6,061,793 A | 5/2000 | Tewfik et al. |
| 6,064,748 A | 5/2000 | Hogan |
| 6,069,914 A | 5/2000 | Cox |
| 6,128,736 A | 10/2000 | Miller |
| 6,154,571 A | 11/2000 | Cox et al. |
| 6,181,334 B1 | 1/2001 | Freeman et al. |
| 6,208,691 B1 | 3/2001 | Balakrishnan et al. |
| 6,208,735 B1 | 3/2001 | Cox et al. |
| 6,209,094 B1 | 3/2001 | Levine et al. |
| 6,215,526 B1 | 4/2001 | Barton et al. |
| 6,219,634 B1 | 4/2001 | Levine |
| 6,240,380 B1 | 5/2001 | Malvar |
| 6,243,481 B1 | 6/2001 | Tao |
| 6,252,586 B1 | 6/2001 | Freeman et al. |
| 6,259,801 B1 | 7/2001 | Wakasu |
| 6,266,419 B1 | 7/2001 | Lacy et al. |
| 6,268,866 B1 | 7/2001 | Shibata |
| 6,272,176 B1 | 8/2001 | Srinivasan |
| 6,278,792 B1 | 8/2001 | Cox et al. |
| 6,298,142 B1 | 10/2001 | Nakano et al. |
| 6,320,965 B1 | 11/2001 | Levine |
| 6,330,672 B1 | 12/2001 | Shur |
| 6,339,449 B1 | 1/2002 | Ikeda et al. |
| 6,343,181 B1 | 1/2002 | Ikeda et al. |
| 6,345,100 B1 | 2/2002 | Levine |
| 6,345,122 B1 | 2/2002 | Yamato et al. |
| 6,370,199 B1 | 4/2002 | Bock et al. |
| 6,373,960 B1 | 4/2002 | Conover et al. |
| 6,381,341 B1 | 4/2002 | Rhoads |
| 6,389,055 B1 | 5/2002 | August et al. |
| 6,415,041 B1 | 7/2002 | Oami et al. |
| 6,421,445 B1 | 7/2002 | Jensen et al. |
| 6,421,450 B2 | 7/2002 | Nakano |
| 6,424,726 B2 | 7/2002 | Nakano et al. |
| 6,425,082 B1 | 7/2002 | Matsui et al. |
| 6,434,253 B1 | 8/2002 | Hayashi et al. |
| 6,442,283 B1 | 8/2002 | Tewfik et al. |
| 6,442,284 B1 | 8/2002 | Gustafson et al. |
| 6,442,285 B2 | 8/2002 | Rhoads et al. |
| 6,453,053 B1 | 9/2002 | Wakasu |
| 6,456,724 B1 | 9/2002 | Watanabe |
| 6,470,090 B2 | 10/2002 | Oami et al. |
| 6,493,457 B1 | 12/2002 | Quackenbush et al. |
| 6,504,870 B2 | 1/2003 | Srinivasan |
| 6,505,223 B1 | 1/2003 | Haitsma et al. |
| 6,507,299 B1 | 1/2003 | Nuijten |
| 6,510,233 B1 | 1/2003 | Nakano |
| 6,512,796 B1 | 1/2003 | Sherwood |
| 6,553,070 B2 | 4/2003 | Hashimoto |
| 6,574,350 B1 | 6/2003 | Rhoads et al. |
| 6,584,138 B1 | 6/2003 | Neubauer et al. |
| 6,587,821 B1 | 7/2003 | Rhoads |
| 6,611,607 B1 | 8/2003 | Davis et al. |
| 6,621,881 B2 | 9/2003 | Srinivasan |
| 6,631,198 B1 | 10/2003 | Hannigan et al. |
| 6,665,419 B1 | 12/2003 | Oami |
| 6,668,068 B2 | 12/2003 | Hashimoto |
| 6,683,996 B1 | 1/2004 | Walmsley |
| 6,687,663 B1 | 2/2004 | McGrath et al. |
| 6,697,499 B2 | 2/2004 | Oami |
| 6,700,993 B1 | 3/2004 | Minematsu |
| 6,721,439 B1 | 4/2004 | Levy et al. |
| 6,724,911 B1 | 4/2004 | Cox et al. |
| 6,735,325 B2 | 5/2004 | Wakasu |
| 6,738,493 B1 | 5/2004 | Cox et al. |
| 6,738,744 B2 | 5/2004 | Kirovski et al. |
| 6,751,337 B2 | 6/2004 | Tewfik et al. |
| 6,768,980 B1 | 7/2004 | Meyer et al. |
| 6,775,416 B1 | 8/2004 | Hashimoto |
| 6,785,399 B2 | 8/2004 | Fujihara |
| 6,798,893 B2 | 9/2004 | Tanaka |
| 6,807,528 B1 | 10/2004 | Truman et al. |
| 6,826,289 B1 | 11/2004 | Hashimoto |
| 6,834,345 B2 | 12/2004 | Bloom et al. |
| 6,839,674 B1 | 1/2005 | Absar et al. |
| 6,845,360 B2 | 1/2005 | Jensen et al. |
| 6,850,619 B1 | 2/2005 | Hirai |
| 6,853,737 B2 | 2/2005 | Watanabe |
| 6,856,693 B2 | 2/2005 | Miller |
| 6,891,854 B2 | 5/2005 | Zhang et al. |
| 6,901,606 B2 | 5/2005 | Wright et al. |
| 6,915,000 B1 | 7/2005 | Tanaka |
| 6,928,165 B1 | 8/2005 | Takai |
| 6,943,457 B2 | 9/2005 | Smith |
| 6,947,562 B2 | 9/2005 | Hashimoto |
| 6,947,572 B2 | 9/2005 | Terasaki |
| 6,985,590 B2 | 1/2006 | Tachibana et al. |
| 6,996,249 B2 | 2/2006 | Miller et al. |
| 7,006,631 B1 | 2/2006 | Luttrell et al. |
| 7,006,660 B2 | 2/2006 | Hayashi |
| 7,007,167 B2 | 2/2006 | Kurahashi |
| 7,027,611 B2 | 4/2006 | Hashimoto |
| 7,047,187 B2 | 5/2006 | Cheng et al. |

(56) References Cited

U.S. PATENT DOCUMENTS

| | | |
|---|---|---|
| 7,050,604 B2 | 5/2006 | Fujihara et al. |
| 7,051,207 B2 | 5/2006 | Watanabe |
| 7,051,351 B2 | 5/2006 | Goldman et al. |
| 7,088,844 B2 | 8/2006 | Hannigan et al. |
| 7,092,546 B2 | 8/2006 | Tanaka |
| 7,110,566 B2 | 9/2006 | Pelly et al. |
| 7,114,071 B1 | 9/2006 | Chmounk et al. |
| 7,114,073 B2 | 9/2006 | Watanabe |
| 7,140,037 B2 | 11/2006 | Tsutsui et al. |
| 7,146,394 B2 | 12/2006 | Haitsma et al. |
| 7,146,501 B2 | 12/2006 | Tanaka |
| 7,149,324 B2 | 12/2006 | Tanaka |
| 7,159,117 B2 | 1/2007 | Tanaka |
| 7,181,022 B2 | 2/2007 | Rhoads |
| 7,197,156 B1 | 3/2007 | Levy |
| 7,206,649 B2 | 4/2007 | Kirovski et al. |
| 7,266,697 B2 | 9/2007 | Kirovski et al. |
| 7,269,734 B1 | 9/2007 | Johnson et al. |
| 7,460,684 B2 | 12/2008 | Srinivasan |
| 7,643,652 B2 | 1/2010 | Srinivasan |
| 7,949,147 B2 | 5/2011 | Rhoads et al. |
| 8,078,301 B2 | 12/2011 | Srinivasan |
| 8,085,975 B2 | 12/2011 | Srinivasan |
| 8,351,645 B2 | 1/2013 | Srinivasan |
| 8,412,363 B2 | 4/2013 | Srinivasan et al. |
| 8,787,615 B2 | 7/2014 | Srinivasan |
| 8,972,033 B2 | 3/2015 | Srinivasan |
| 2001/0027393 A1 | 10/2001 | Touimi et al. |
| 2001/0028715 A1 | 10/2001 | Watanabe |
| 2001/0031064 A1 | 10/2001 | Donescu et al. |
| 2001/0053190 A1 | 12/2001 | Srinivasan |
| 2002/0006203 A1 | 1/2002 | Tachibana et al. |
| 2002/0034224 A1 | 3/2002 | Srinivasan |
| 2002/0044225 A1 | 4/2002 | Rakib |
| 2002/0085736 A1 | 7/2002 | Kalker et al. |
| 2002/0085737 A1 | 7/2002 | Kitamura |
| 2002/0087864 A1 | 7/2002 | Depovere et al. |
| 2002/0106106 A1 | 8/2002 | Sato |
| 2002/0129253 A1 | 9/2002 | Langelaar |
| 2002/0147990 A1 | 10/2002 | Lu et al. |
| 2003/0004589 A1 | 1/2003 | Bruekers et al. |
| 2003/0016756 A1 | 1/2003 | Steenhof et al. |
| 2003/0086587 A1 | 5/2003 | Haitsma et al. |
| 2003/0088400 A1 | 5/2003 | Nishio et al. |
| 2003/0123660 A1 | 7/2003 | Fletcher et al. |
| 2003/0128861 A1 | 7/2003 | Rhoads |
| 2003/0161469 A1 | 8/2003 | Cheng et al. |
| 2003/0169810 A1 | 9/2003 | Costa |
| 2004/0024588 A1 | 2/2004 | Watson et al. |
| 2004/0054525 A1 | 3/2004 | Sekiguchi |
| 2004/0059918 A1 | 3/2004 | Xu |
| 2004/0179746 A1 | 9/2004 | Hashimoto |
| 2004/0258243 A1 | 12/2004 | Shin et al. |
| 2004/0267532 A1 | 12/2004 | Black |
| 2004/0267533 A1 | 12/2004 | Hannigan et al. |
| 2005/0010944 A1 | 1/2005 | Wright et al. |
| 2005/0062843 A1 | 3/2005 | Bowers et al. |
| 2005/0144006 A1 | 6/2005 | Oh |
| 2006/0020809 A1 | 1/2006 | Hayashi |
| 2006/0123443 A1 | 6/2006 | Hamilton et al. |
| 2006/0171474 A1 | 8/2006 | Ramaswamy et al. |
| 2006/0187358 A1 | 8/2006 | Lienhart et al. |
| 2006/0239500 A1 | 10/2006 | Meyer et al. |
| 2007/0036357 A1 | 2/2007 | Van der Veen et al. |
| 2007/0300066 A1 | 12/2007 | Srinivasan |
| 2008/0091288 A1 | 4/2008 | Srinivasan |
| 2008/0253440 A1 | 10/2008 | Srinivasan et al. |
| 2009/0074240 A1 | 3/2009 | Srinivasan |
| 2010/0046795 A1 | 2/2010 | Srinivasan |
| 2012/0022879 A1 | 1/2012 | Srinivasan |
| 2012/0039504 A1 | 2/2012 | Srinivasan |
| 2013/0094690 A1 | 4/2013 | Srinivasan |
| 2014/0321695 A1 | 10/2014 | Srinivasan |
| 2015/0170661 A1 | 6/2015 | Srinivasan |

FOREIGN PATENT DOCUMENTS

| | | |
|---|---|---|
| AU | 2010200873 | 4/2010 |
| CA | 2529310 | 1/2005 |
| CN | 1266586 | 9/2000 |
| CN | 1276936 | 12/2000 |
| CN | 101950561 | 1/2011 |
| CN | 102592638 | 7/2012 |
| EP | 0651554 | 5/1995 |
| EP | 1104969 | 6/2001 |
| FR | 2820573 | 8/2002 |
| WO | 9837513 | 8/1998 |
| WO | 9963443 | 12/1999 |
| WO | 0022605 | 4/2000 |
| WO | 0064094 | 10/2000 |
| WO | 0157783 | 8/2001 |
| WO | 0217214 | 2/2002 |
| WO | 0249363 | 6/2002 |
| WO | 02060182 | 8/2002 |
| WO | 02063609 | 8/2002 |
| WO | 03009602 | 1/2003 |
| WO | 2005002200 | 1/2005 |
| WO | 2005008582 | 1/2005 |
| WO | 2005099385 | 10/2005 |
| WO | 2006014362 | 2/2006 |
| WO | 2008045950 | 4/2008 |

OTHER PUBLICATIONS

Advanced Television Systems Committee, "ATSC Standard: Digital Audio Compression (AC-3), Revision A," Washington, D.C., USA, Dec. 20, 1995 (140 pages).

Cheng et al., "Enhanced Spread Spectrum Watermarking of MPEG-2, AAC Audio," Department of Electrical Engineering, Texas A&M University, College Station, T.X., U.S.A, and Panasonic Information and Networking Technologies Lab, Princeton, NJ, USA, pp. IV-3728-IV-3731, 2002 (4 pages).

Cheung, W.N., "Digital Image Watermarking in Spatial and Transform Domains," Centre for Advanced Telecommunications and Quantum Electronics Research, University of Canberra, Australia, 2000 (6 pages).

Chiariglione, Leonardo, "International Organisation for Standardisation Organisation Internationale de Normalisation," ISO/IEC JTC 1/SC 29/WG 11 N3954, Resolutions of 56th WG 11 Meeting, Mar. 2001, (21 pages).

Davidson, Grant A., "Digital Audio Coding: Dolby AC-3," pp. 41-1-41-21, CRC Press LLC, 1998 (22 pages).

De Smet et al., "Subband Based MPEG Audio Mixing for Internet Streaming Applications," 2001 ICASSP (4 pages).

Decarmo, Linden, "Pirates on the Airwaves," www.emedialive.com, Sep. 1999 (8 pages).

Fraunhofer Institute for Integrated Circuits, "Audio and Multimedia Watermarking," www.iis.fraunhoder.de/amm/techinf/water, 1998 (7 pages).

Hartung et al., "Watermarking of Uncompressed and Compressed Video," Telecommunications Institute I, University of Erlangen-Nuremberg, Germany, 1998 (26 pages).

Haskell et al., "Digital Video: An Introduction to MPEG-2," pp. 55-79, 1996 (26 pages).

Herre et al., "Audio Watermarking in the Bitstream Domain," Fraunhofer Institute for Integrated Circuits (FhG-IIS), Enlangen, Germany; Signal and Image Processing Lab 25th Anniversary's Project Presentation and Workshop held on Jun. 12 and 13, 2000 (23 pages).

Lacy et al., "On Combining Watermarking with Perceptual Coding," AT&T Labs, Florham Park, NJ., USA, pp. 3725-3728, 1998 (4 pages).

Liang et al., "Video Watermarking Combining with Hybrid Coding Scheme," Department of E.E., Fudan University, Shanghai, China, 2002 (5 pages).

Princen et al., "Analysis/Synthesis Filter Bath Design Based on Time Domain Aliasing Cancellation," IEEE Transactions on Acoustics, Speech, and Signal Processing, vol. ASSP=34, No. 5, Oct. 1986 (9 pages).

(56) References Cited

OTHER PUBLICATIONS

Stautner, John P., "Scalable Audio Compression for Mixed Computing Environments," Aware, Inc., Cambridge, MA, USA, Presented at the 93rd Convention for An Audio Engineering Society held in San Francisco, CA, USA, on Oct. 1-4, 1992 (4 pages).
Touimi et al., "A summation Algorithm for MPEG-1 Coded Audio Signals: A First Step Towards Audio Processing in the Compressed Domain," Annals of Telecommunications, vol. 55, No. 3-4, Mar. 1, 2000 (10 pages).
KIPO, "Notice of Allowance," issued in connection with Korean Patent Application No. 10-2007-7002769, dated Aug. 29, 2011 (3 pages).
MyIPO, "Substantive Examination Adverse Report," issued in connection with Malaysian Patent Application No. PI20042284, mailed on Mar. 20, 2009 (3 pages).
SIPO, "First Notification of Office Action," issued in connection with Chinese Patent Application No. 200480020200.8, on Mar. 27, 2009 (11 pages).
SIPO, "Notice of Decision of Granting Patent Right for Invention," issued in connection with Chinese Patent Application No. 200480020200.8, issued on Jul. 23, 2010 (2 pages).
SIPO, "First Notification of Office Action," issued in connection with Chinese Patent Application No. 200580026107.2, issued on Jul. 11, 2008 (7 pages).
SIPO, "Second Notification of Office Action," issued in connection with Chinese Patent Application No. 200580026107.2, issued on Jun. 9, 2011 (6 pages).
SIPO, "First Notification of Office Action," issued in connection with Chinese Patent Application No. 201010501205.X, on Mar. 15, 2011 (7 pages).
TIPO, "Office Action," issued in connection with counterpart PCT Application No. 93117000, mailed Nov. 4, 2010 (6 pages).
TIPO, "Notice of Allowance," issued in connection with Taiwanese Application No. 93117000, mailed Feb. 23, 2011 (3 pages).
SIPO, "Second Notification of Office Action," issued in connection with Chinese Patent Application No. 201010501205.X, on Feb. 20, 2012 (6 pages).
SIPO, "Notice of Decision of Granting Patent Right for Invention," issued in connection with Chinese Patent Application No. 201010501205.X, on Aug. 30, 2012 (3 pages).
SIPO, "Notice of Decision of Granting Patent Right for Invention," issued in connection with Chinese Patent Application No. 200580026107.2, issued on Oct. 20, 2011 (4 pages).
SIPO, "First Office Action", issued in connection with corresponding Chinese Patent Application No. 201110460586.6, dated Mar. 5, 2014 (13 pages).
CIPO, "Office Action," issued in connection with Canadian Patent Application No. 2,529,310, on Apr. 6, 2011 (3 pages).
EPO, "Supplementary European Search Report," issued in connection with European Patent Application No. 05780308.2, Jun. 24, 2010 (5 pages).
EPO, "Supplementary European Search Report," issued in connection with European Patent Application No. 04776572.2, dated Aug. 31, 2011 (3 pages).
IP Australia, "Examiner's First Report," issued in connection with Australian Patent Application No. 2004258470, mailed on Sep. 5, 2008 (9 pages).
IP Australia, "Examiner's First Report," issued in connection with Australian Patent Application No. 2005270105, mailed on Feb. 22, 2010 (2 pages).
IP Australia, "Examiner's First Report," issued in connection with Australian Patent Application No. 2010200873, mailed on Aug. 11, 2011 (2 pages).
IP Australia, "Examiner's First Report," issued in connection with Australian Patent Application No. 2011203047, mailed on Feb. 8, 2012 (2 pages).
IP Australia, "Notice of Acceptance," issued in connection with Australian Patent Application No. 2004258470, mailed on Nov. 25, 2009 (3 pages).

IP Australia, "Notice of Acceptance," issued in connection with Australian Patent Application No. 2005270105, mailed on Mar. 18, 2011 (4 pages).
USPTO, "Non-Final Office Action," issued in connection with U.S. Appl. No. 11/298,040, on May 15, 2008 (15 pages).
USPTO, "Notice of Allowance," issued in connection with U.S. Appl. No. 11/298,040, on Aug. 22, 2008 (8 pages).
PCT, "International Search Report and Written Opinion," issued in connection with PCT Application No. PCT/US2004/018645, mailed Apr. 19, 2005 (9 pages).
PCT, "International Preliminary Report on Patentability," issued in connection with PCT Application No. PCT/US2004/018953, mailed Jan. 4, 2006 (22 pages).
PCT, "International Search Report and Written Opinion," issued in connection with PCT Application No. PCT/US2005/023578, mailed on Jan. 11, 2006 (6 pages).
PCT, "International Preliminary Report on Patentability," issued in connection with PCT Application No. PCT/US2005/023578, completed on Aug. 25, 2006 (20 pages).
PCT, "International Search Report and Written Opinion," issued in connection with PCT Application No. PCT/US2007/080973, mailed on Apr. 23, 2008 (7 pages).
PCT, "International Preliminary Report on Patentability," issued in connection with PCT Application No. PCT/US2007/080973, mailed Apr. 23, 2009 (7 pages).
USPTO, "Notice of Allowance," issued in connection with U.S. Appl. No. 12/269,733, on Aug. 6, 2009 (9 pages).
USPTO, "Non-Final Office Action," issued in connection with U.S. Appl. No. 12/613,334, on Nov. 15, 2010 (10 pages).
USPTO, "Non-Final Office Action," issued in connection with U.S. Appl. No. 12/613,334, on Apr. 26, 2011 (7 pages).
USPTO, "Notice of Allowance," issued in connection with U.S. Appl. No. 12/613,334, on Oct. 13, 2011 (10 pages).
USPTO, "Non-Final Office Action," issued in connection with U.S. Appl. No. 13/283,271, on May 3, 2012 (6 pages).
USPTO, "Non-Final Office Action," issued in connection with U.S. Appl. No. 11/870,275, on Nov. 23, 2010 (37 pages).
USPTO, "Notice of Allowance," issued in connection with U.S. Appl. No. 11/870,275, on May 20, 2011 (5 pages).
European Patent Office, "Extended Search Report," issued in connection with European Application No. 07844106.0, dated May 17, 2013 (6 pages).
IP Australia, "First Examiner's Report," issued in connection with Australian Patent Application No. 2012261653, dated Jan. 29, 2014 (3 pages).
Canadian Intellectual Property Office, "Office Action," issued in connection with Canadian Application No. 2,572,622, dated May 3, 2013, (3 pages).
Government of India Patent Office, "First Examination Report," issued in connection with IN Patent Application No. 465/DEL NP/2007, dated Nov. 26, 2013, 2 pages.
European Patent Office, "Examination Report" issued in connection with European Application No. 07844106.0, dated Feb. 5, 2014, (6 pages).
Canadian Intellectual Property Office, "Notice of Allowance," issued in connection with Canadian Patent Application No. 2,529,310, on Mar. 8, 2012 (1 page).
European Patent Office, "Examination Report," issued in connection with European Patent Application No. 04776572.2, dated Apr. 25, 2012 (4 pages).
European Patent Office, "Examination Report," issued in connection with European Patent Application No. 05780308.2, dated Nov. 18, 2011 (9 pages).
European Patent Office, "Summons to Attend Oral Proceedings Pursuant to Rule 115(1) EPC," issued in connection with European Patent Application No. 05780308.2, dated Jan. 2, 2013 (4 pages).
European Patent Office, "Intention to Grant Pursuant to Rule 71(3) EPC," issued in connection with European Patent Application No. 05780308.2, dated Apr. 8, 2013 (69 pages).
IP Australia, "Notice of Acceptance," issued in connection with Australian Patent Application No. 2010200873, mailed on Aug. 22, 2012 (3 pages).

(56) References Cited

OTHER PUBLICATIONS

IP Australia, "Notice of Acceptance," issued in connection with Australian Patent Application No. 2011203047, mailed on Mar. 5, 2013 (2 pages).

PCT, "International Preliminary Report on Patentability," issued in connection with PCT Application No. PCT/US2004/018645, mailed Dec. 13, 2005 (6 pages).

PCT, "International Search Report and Written Opinion," issued in connection with PCT Application No. PCT/US2004/018953, mailed Apr. 29, 2005 (8 pages).

USPTO, "Notice of Allowance," issued in connection with U.S. Appl. No. 11/870,275, on Sep. 26, 2011 (5 pages).

USPTO, "Supplemental Notice of Allowance," issued in connection with U.S. Appl. No. 11/870,275, mailed on Oct. 5, 2011 (3 pages).

Watson et al., "Design and Implementation of AAC Decoders," Dolby Laboratories, Inc., San Francisco, CA, USA, 2000 (2 pages).

United States Patent and Trademark Office, "Notice of Allowance", issued in connection with U.S. Appl. No. 13/708,262, dated Mar. 6, 2014 (9 pages).

Xu et al., "Content-Based Digital Watermarking for Compressed Audio," Department of Computer Science, The University of Sydney, New South Wales, Australia, 2006 (13 pages).

United States Patent and Trademark Office, "Notice of Allowance", issued in connection with U.S. Appl. No. 13/283,271, dated Sep. 18, 2012 (11 pages).

United States Patent and Trademark Office, "Office Action", issued in connection with U.S. Appl. No. 11/571,483, dated Jun. 13, 2012 (12 pages).

United States Patent and Trademark Office, "Notice of Allowance", issued in connection with U.S. Appl. No. 11/571,483, dated Nov. 30, 2012 (5 pages).

United States Patent and Trademark Office, "Office Action", issued in connection with U.S. Appl. No. 13/708,262, dated Aug. 19, 2013 (39 pages).

Hartung et al., "Digital Watermarking of MPEG-2 Coded Video in the Bitstream Domain," IEEE, 1997 (4 pages).

Swanson et al., "Transparent Robust Image Watermarking," IEEE, 1996 (4 pages).

Cox et al., "Secure Spread Spectrum Watermarking for Multimedia," IEEE Transactions on Image Processing, vol. 6, No. 12, Dec. 1997 (15 pages).

Tirkel et al., "Image Watermarking—A Spread Spectrum Application," IEEE, 1996 (5 pages).

Silvestre et al., "Image Watermarking using Digital Communication Technology," IEE IPA97, Jul. 15-17, 1997 (5 pages).

IP Australia, "Examination Report", issued in connection with Australian Patent Application No. 2012261653, dated Jan. 29, 2014 (3 pages).

IP Australia, "Notice of Acceptance", issued in connection with Australian Patent Application No. 2012261653, dated Mar. 14, 2015 (2 pages).

United States Patent and Trademark Office, "Notice of Allowance", issued in connection with U.S. Appl. No. 13/250,354, dated Oct. 24, 2014 (5 pages).

United States Patent and Trademark Office, "Non-Final Office Action", issued in connection with U.S. Appl. No. 14/330,681, dated Apr. 8, 2015 (6 pages).

European Patent Office, "Intention to Grant", issued in connection with European Patent Application No. 07844106.0, dated Mar. 17, 2015 (44 pages).

United States Patent and Trademark Office, "Non-Final Office Action", issued in connection with U.S. Appl. No. 14/631,395, dated May 22, 2015 (9 pages).

IP Australia, "Notice of Grant", issued in connection with Australian Patent Application No. 2012261653, dated Jul. 9, 2015 (2 pages).

European Patent Office, "Decision to grant", issued in connection with European Patent Application No. 07844106.0, dated Aug. 13, 2015 (2 pages).

United States Patent and Trademark Office, "Notice of Allowance", issued in connection with U.S. Appl. No. 14/330,681, dated Aug. 3, 2015 (9 pages).

| Mantissa Decimal | Bit Pattern | Mantissa Value |
|---|---|---|
| 0 | 0000 | -14/15 |
| 1 | 0001 | -12/15 |
| 2 | 0010 | -10/15 |
| 3 | 0011 | -8/15 |
| 4 | 0100 | -6/15 |
| 5 | 0101 | -4/15 |
| 6 | 0110 | -2/15 |
| 7 | 0111 | 0 |
| 8 | 1000 | +2/15 |
| 9 | 1001 | +4/15 |
| 10 | 1010 | +6/15 |
| 11 | 1011 | +8/15 |
| 12 | 1100 | +10/15 |
| 13 | 1101 | +12/15 |
| 14 | 1110 | +14/15 |

METHODS AND APPARATUS FOR MIXING COMPRESSED DIGITAL BIT STREAMS

RELATED APPLICATIONS

This patent arises from a continuation of U.S. patent application Ser. No. 11/571,483 (now U.S. Pat. No. 8,412,363), entitled "Methods and Apparatus for Mixing Compressed Digital Bit Streams" and filed on Dec. 29, 2006, which corresponds to the U.S. national stage of International Patent Application No. PCT/US2005/023578, entitled "Methods and Apparatus for Mixing Compressed Digital Bit Streams" and filed on Jun. 29, 2005, which claims priority from U.S. Provisional Application Ser. No. 60/585,115, entitled "Mixing System and Method for Compressed Bit Streams" and filed on Jul. 2, 2004, and U.S. Provisional Application Ser. No. 60/586,354, entitled "Mixing System and Method for Compressed Bit Streams" and filed on Jul. 8, 2004. This patent is also related to International Patent Application No. PCT/US04/18953, entitled "Methods and Apparatus for Embedding Watermarks" and filed on Jun. 14, 2004. U.S. patent application Ser. No. 11/571,483, International Patent Application No. PCT/US2005/023578, U.S. Provisional Application Ser. No. 60/585,115, U.S. Provisional Application Ser. No. 60/586,354, and International Patent Application No. PCT/US04/18953 are hereby incorporated by reference in their entireties.

TECHNICAL FIELD

The present disclosure relates generally to digital compression, and more particularly, to methods and apparatus for mixing compressed digital bit streams.

BACKGROUND

In modern television or radio broadcast stations, compressed digital bit streams are typically used to carry video and/or audio data for transmission. For example, the Advanced Television Systems Committee (ATSC) standard for digital television (DTV) broadcasts in the United States adopted Moving Picture Experts Group (MPEG) standards (e.g., MPEG-1, MPEG-2, MPEG-3, MPEG-4, etc.) for carrying video content and Digital Audio Compression standards (e.g., AC-3, which is also known as Dolby Digital®) for carrying audio content (i.e., ATSC Standard: Digital Audio Compression (AC-3), Revision A, August 2001). The AC-3 compression standard is based on a perceptual digital audio coding technique that reduces the amount of data needed to reproduce the original audio signal while minimizing perceptible distortion. In particular, the AC-3 compression standard recognizes that at particular spectral frequencies the human ear is unable to perceive changes in spectral energy that are smaller than the masking energy at those spectral frequencies. The masking energy is a characteristic of an audio segment dependent on the tonality and noise-like characteristic of the audio segment. Different known psycho-acoustic models may be used to determine the masking energy at a particular spectral frequency. Further, the AC-3 compression standard provides a multi-channel digital audio format (e.g., a 5.1 channel format) for digital television (DTV), high definition television (HDTV), digital versatile discs (DVDs), digital cable, and satellite transmissions that enables the broadcast of special sound effects (e.g., surround sound).

Some broadcast scenarios call for an auxiliary audio service (AAS), such as an audio service containing voice-over material, to be mixed with a main audio service (MAS), which may correspond to the main television or radio program being broadcast. The AAS may originate either as live audio or may be stored in an analog, an uncompressed digital or a compressed digital format. Mixing of the AAS with the MAS usually includes attenuating the MAS and adding the AAS such that the AAS becomes audible while the MAS is still present at a low, but perceptible, level.

In traditional analog broadcasting, the mixing of two audio sources (e.g., the AAS and the MAS) is a relatively straightforward task involving well-known attenuation and amplification circuits. Similarly, the mixing of two uncompressed digital audio streams is also a relatively straightforward task because uncompressed digital samples can be mixed using known, linear attenuation and addition techniques. However, the mixing of two audio sources when either one or both of the audio sources provides compressed digital audio streams, as in the case of all-digital modern broadcast facilities, is significantly more complex. In some known systems, mixing of one or more compressed digital audio streams requires decompression of all the streams to be mixed. Mixing is then performed using the uncompressed data streams and then the resulting mixed data stream is recompressed. However, such approaches requiring decompression of the source digital streams and recompression of the mixed data stream are undesirable because recompression is an expensive operation that requires additional equipment, causes additional audio time delays, and increases the number of potential failure modes resulting from the numerous additional processing steps.

DETAILED DESCRIPTION

In general, methods and apparatus for combining compressed digital bit streams are disclosed. The methods and apparatus disclosed herein may be used to combine compressed digital bit streams without prior decompression of the compressed digital bit streams. As a result, the methods and apparatus disclosed herein eliminate the need to subject compressed digital bit streams to multiple decompression/compression cycles, which are typically unacceptable to, for example, affiliates of television broadcast networks because multiple decompression/compression cycles may significantly degrade the quality of the media content provided by the compressed digital bit streams. While the examples presented herein focus on the mixing of two digital bit streams, each carrying audio content, the disclosed methods and apparatus may be applied more generally to the combining, in any suitable manner, of any number of digital data streams carrying any type of content in any appropriate format.

Prior to broadcast, for example, the methods and apparatus disclosed herein may be used to unpack the Modified Discrete Cosine Transform (MDCT) coefficient sets associated with a compressed main digital bit stream formatted according to a digital audio compression standard, such as the AC-3 compression standard. The mantissas of the unpacked MDCT coefficient sets may be modified to mix an auxiliary digital bit stream with the main compressed digital bit stream. The resulting modified MDCT coefficients may be repacked to form a compressed mixed digital bit stream for transmission to one or more media consumption sites. In this manner, the auxiliary digital bit stream may be mixed directly with the compressed version of the main digital bit stream without requiring decompression of the compressed main digital bit stream and subsequent recompression of the mixed digital bit stream.

Figure 1:
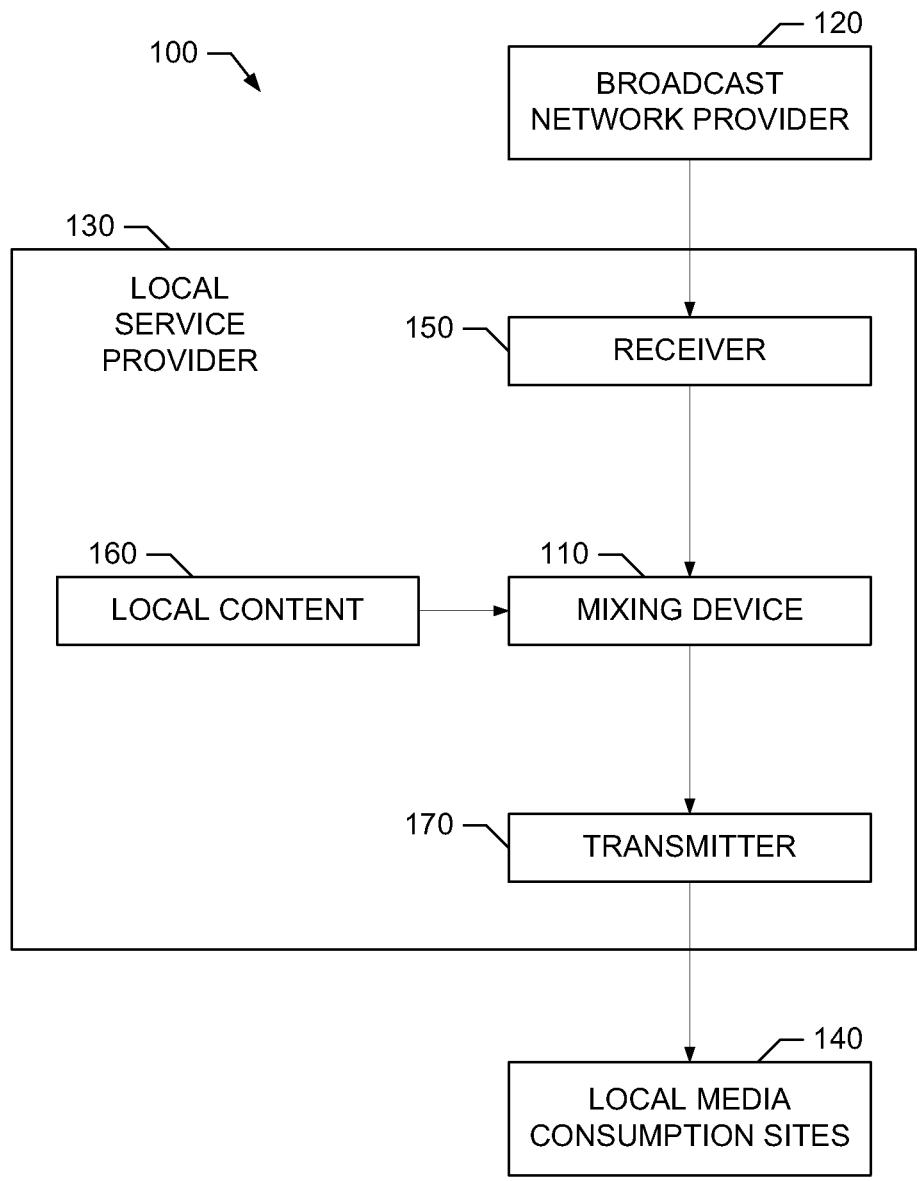
FIG. 1 is a block diagram of an example environment of use for the example mixing device of FIG. 2.

Referring to FIG. 1, an example environment of use 100 illustrates the operation of an example mixing device 110 in a broadcast system including a broadcast network provider 120 and a local service provider 130 serving a number of local media consumption sites 140. The broadcast network provider 120 may be any type of broadcast network provider capable of providing broadcast content to one or more local service providers 130. For example, the broadcast network provider 120 may package audio, video and/or multimedia content corresponding to television programs, radio programs, sporting events, newscasts and/or the like for transmission to a local service provider 130 for subsequent transmission to the local media consumption sites 140 served by the particular local service provider 130. In many circumstances, the audio, video and/or multimedia content generated by the broadcast network provider 120 is generic content suitable for consumption by a broad audience. In such circumstances, the local service provider 130 may tailor the generic content provided by the broadcast network provider 120 for consumption by a particular local audience associated with the local media consumption sites 140.

The local service provider 130 may be implemented by any service provider, such as, for example, a local cable television service provider, a local radio frequency (RF) television service provider, a local radio broadcast provider, etc. The local service provider 130 receives broadcast content from the broadcast network provider 120 via a receiver 150. The receiver 150 may be implemented by any suitable type of receiver based on the communication link between the broadcast network provider 120 and the local service provider 130, such as a satellite receiver, a high-speed digital network receiver, etc. Additionally, the local service provider 130 may generate local content 160 to be mixed with the broadcast content received by the receiver 150 to, for example, tailor the broadcast content for consumption by a particular local audience associated with the local media consumption sites 140. The broadcast content received via the receiver 150 and the local content 160 are applied to the mixing device 110 to generate mixed broadcast content for broadcast to the local media consumption sites 140 via the transmitter 170. The transmitter 170 may be implemented using any suitable type of transmitter appropriate to the local service provider 130, such as a cable television transmitter, an RF television transmitter, a broadcast radio transmitter, etc.

Although the example environment of use 100 depicts the mixing device 110 as operating in conjunction with a local service provider 130 to mix content from a broadcast network provider 120 with local content 160, other uses are also possible. For example, the mixing device 110 could be used by the broadcast network provider 120 to mix content from multiples sources to generate the broadcast content to be provided to the local service provider 130. Additionally or alternatively, the mixing device 110 could be used by the local service provider 130 to mix content from multiples sources to generate the local content 160. More generally, the mixing device 110 could be used in any scenario in which content from multiple sources is to be mixed to generate resulting mixed content.

Figure 2:
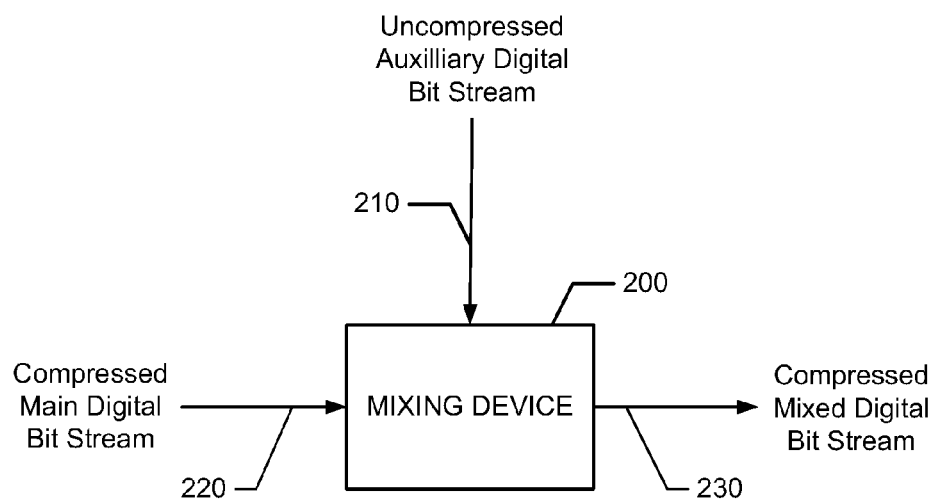
FIG. 2 is a block diagram of an example mixing device to mix compressed digital bit streams for use in the example environment of FIG. 1.

FIG. 2 depicts an example mixing device 200 configured to mix an uncompressed auxiliary digital bit stream 210 with a compressed main digital bit stream 220 to generate a resulting compressed mixed digital bit stream 230. The example mixing device 200 may be used to implement the example mixing device 110 of FIG. 1, for example, in cases in which the local content 160 is formatted as an uncompressed digital bit stream (e.g., corresponding to the uncompressed auxiliary digital bit stream 210) and the broadcast content provided by the broadcast network provider 120 is formatted as a compressed digital bit stream (e.g., corresponding to the compressed main digital bit stream 220). The compressed main digital bit stream 220 may be compressed according to, for example, an audio compression standard, such as the AC-3 compression standard and/or the MPEG-AAC compression standard, either of which may be used to process blocks of an audio signal using a predetermined number of digitized samples from each block. The source of the compressed digital bit stream 220 (not shown) may be sampled at a rate of, for example, 48 kilohertz (kHz) to form audio blocks as described below.

Typically, audio compression techniques, such as those based on the AC-3 compression standard, use overlapped audio blocks and the MDCT algorithm to convert an audio signal into a compressed digital bit stream (e.g., the compressed main digital bit stream 220 of FIG. 2). Two different block sizes (i.e., short and long blocks) may be used depending on the dynamic characteristics of the sampled audio signal. For example, AC-3 short blocks may be used to minimize pre-echo for transient segments of the audio signal and AC-3 long blocks may be used to achieve high compression gain for non-transient segments of the audio signal. In accordance with the AC-3 compression standard, an AC-3 long block corresponds to a block of 512 time-domain audio samples, whereas an AC-3 short block corresponds to 256 time-domain audio samples. Based on the overlapping structure of the MDCT algorithm used in the AC-3 compression standard, in the case of the AC-3 long block, the 512 time-domain samples are obtained by concatenating a preceding (old) block of 256 time-domain samples and a current (new) block of 256 time-domain samples to create an audio block of 512 time-domain samples. The AC-3 long block is then transformed using the MDCT algorithm to generate 256 transform coefficients. In accordance with the same standard, an AC-3 short block is similarly obtained from a pair of consecutive time-domain sample blocks of audio. The AC-3 short block is then transformed using the MDCT algorithm to generate 128 transform coefficients. The 128 transform coefficients corresponding to two adjacent short blocks are then interleaved to generate a set of 256 transform coefficients. Thus, processing of either AC-3 long or AC-3 short blocks results in the same number of MDCT coefficients. As another example, in accordance with the MPEG-AAC compression standard, a short block contains 128 samples and a long block contains 1024 samples.

Figure 3:
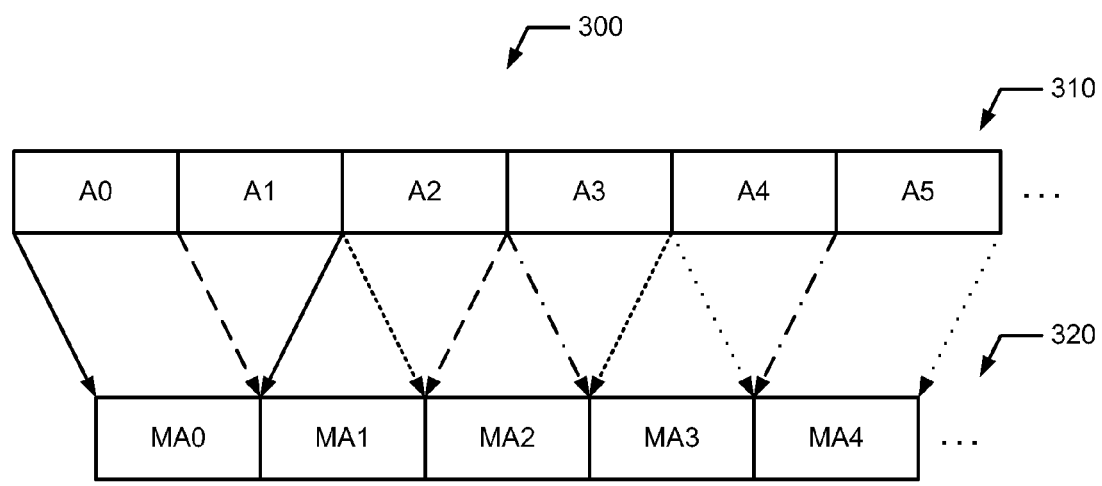
FIG. 3 depicts an example single-channel compressed digital audio bit stream to be processed with the example mixing device of FIG. 2.

FIG. 3 illustrates the format 300 of an example single-channel compressed digital bit stream to be processed as the compressed main digital bit stream 220 by the example mixing device 200 of FIG. 2. The format 300 is based on an uncompressed digital bit stream which includes a plurality of 256-sample time-domain audio blocks 310, generally shown as A0, A1, A2, A3, A4, and A5. The MDCT algorithm processes the audio blocks 310 to generate MDCT coefficient sets 320, shown by way of example as MA0, MA1, MA2, MA3, MA4, and MA5 (where MA5 is not shown). For example, the MDCT algorithm may process the audio blocks A0 and A1 to generate the MDCT coefficient set MA0. The audio blocks A0 and A1 are concatenated to generate a 512-sample audio block (e.g., an AC-3 long block) that is MDCT transformed using the MDCT algorithm to generate the MDCT coefficient set MA0 containing 256 MDCT coefficients. Similarly, the audio blocks A1 and A2 may be processed to generate the MDCT coefficient set MA1. Thus, the audio block A1 is an overlapping audio block because it is used to generate both MDCT coefficient sets MA0 and MA1. In a similar manner, the MDCT algorithm is used to transform the audio blocks A2 and A3 to generate the MDCT coefficient set MA2, the audio blocks A3 and A4 to generate the MDCT coefficient set MA3, the audio blocks A4 and A5 to generate the MDCT coefficient set MA4, etc. Thus, the audio block A2 is an overlapping audio block used to generate the MDCT coefficient sets MA1 and MA2, the audio block A3 is an overlapping audio block used to generate the MDCT coefficient sets MA2 and MA3, the audio block A4 is an overlapping audio block used to generate the MDCT coefficient sets MA3 and MA4, etc. Together, the MDCT coefficient sets 320 are packed to form the compressed digital bit stream 220 of FIG. 2.

Figures 4, 6:
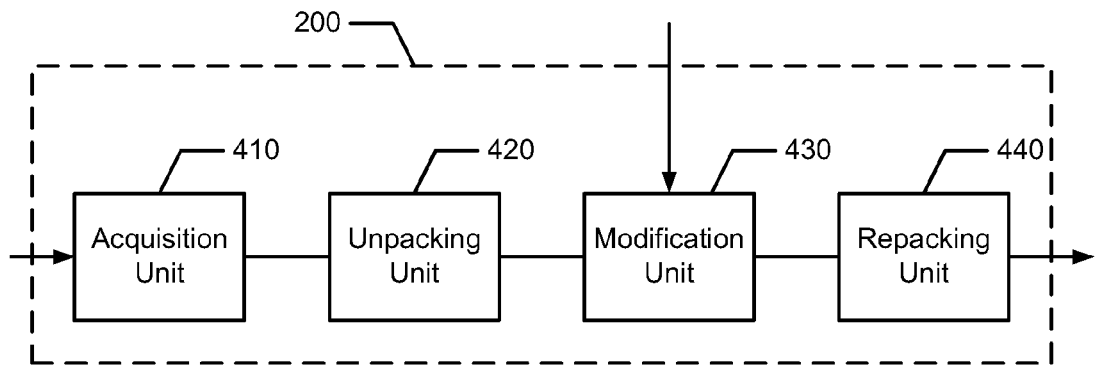
FIG. 4 is a block diagram illustrating an example manner of implementing the example mixing device of FIG. 2.
FIG. 6 depicts an example quantization look-up table that may be used to implement the example mixing device of FIG. 4.

FIG. 4 illustrates an example implementation of the mixing device 200 of FIG. 2. In the example of FIG. 4, the mixing device 200 includes an acquisition unit 410, an unpacking unit 420, a modification unit 430, and a repacking unit 440. While the operation of the mixing device 200 is described below in accordance with the AC-3 compression standard, the mixing device 200 may be implemented to operate with additional and/or other compression standards, such as, for example, the MPEG-AAC compression standard. The operation of the mixing device 200 is described in greater detail using the example of FIG. 5.

Figure 5:
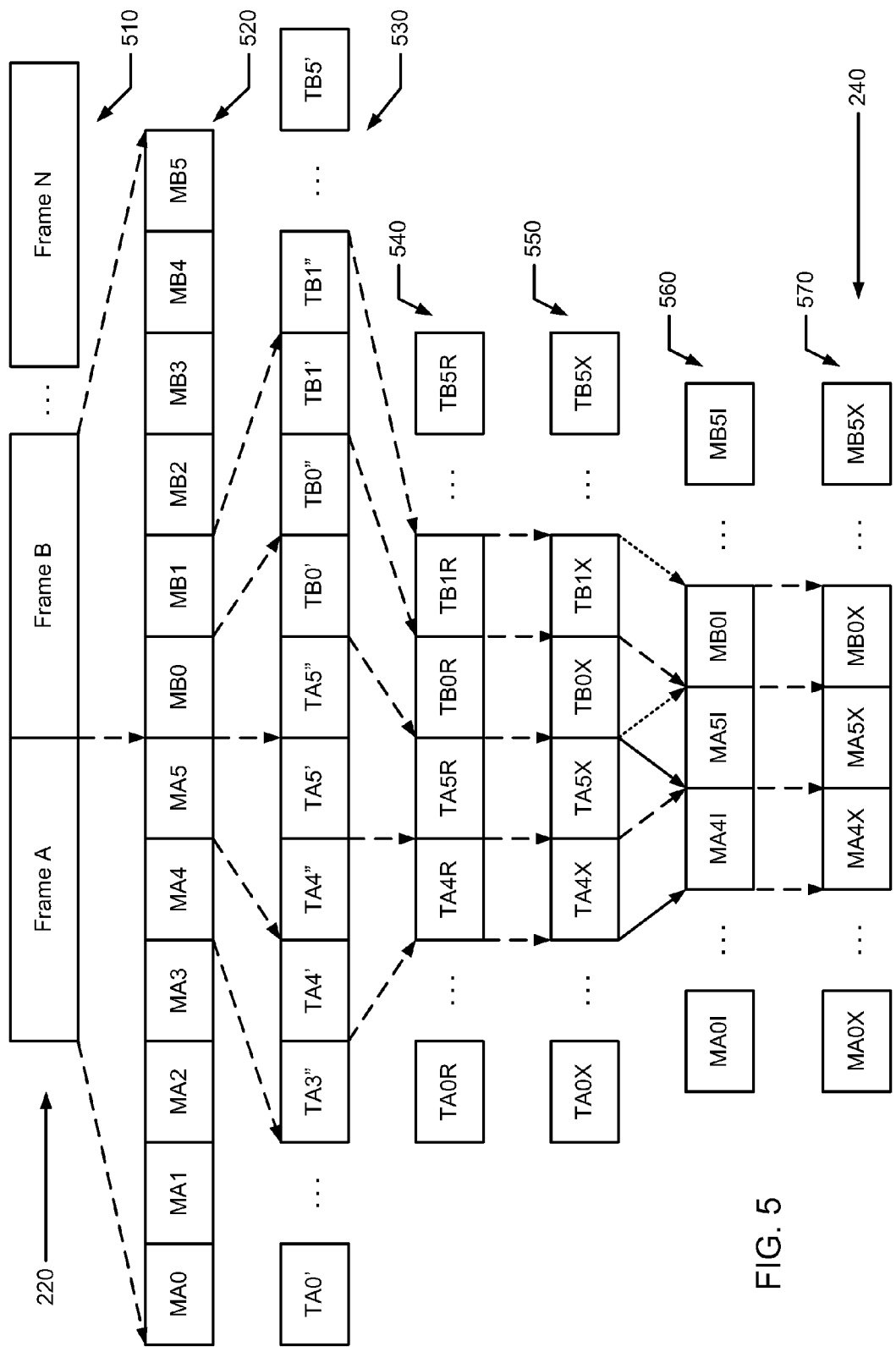
FIG. 5 depicts an example sequence of operations performed on the example single-channel compressed digital audio bit stream of FIG. 3 by the example mixing device of FIG. 4.

The acquisition unit 410 is configured to acquire one or more frames 510 (shown in FIG. 5) associated with the compressed digital bit stream 220 (shown in FIG. 2), a portion of which is shown by way of example as Frame A and Frame B in FIG. 5. As mentioned previously, the compressed digital bit stream 220 may be a digital bit stream compressed in accordance with the AC-3 standard (hereinafter referred to as the "AC-3 data stream" 220). While the AC-3 data stream 220 may include multiple channels, for purposes of clarity, the following example describes the AC-3 data stream 220 as including only one channel. In the AC-3 data stream 220, each of the frames 510 includes a plurality of original MDCT coefficient sets 520. In accordance with the AC-3 compression standard, for example, each of the frames 510 includes six original MDCT coefficient sets (i.e., six "audblks", wherein each MDCT coefficient set corresponds to an AC-3 audblk). For example, Frame A includes the original MDCT coefficient sets MA0, MA1, MA2, MA3, MA4 and MA5 and Frame B includes the original MDCT coefficient sets MB0, MB1, MB2, MB3, MB4 and MB5.

The acquisition unit 410 is also configured to process header information associated with each of the frames 510, such as, for example, the number of channels associated with the AC-3 data stream 220. While the example AC-3 data stream 220 includes only one channel as noted above, an example compressed digital bit stream having multiple channels is described below in connection with FIGS. 7 and 8.

Returning to FIGS. 4 and 5, the unpacking unit 420 is configured to unpack the original MDCT coefficient sets 520 to determine compression information, such as, for example, the parameters of the original compression process (i.e., the manner in which an audio compression technique compressed an audio signal or audio data to form the compressed digital data stream 220). For example, the unpacking unit 420 may determine how many bits are used to represent each of the original MDCT coefficients within the original MDCT coefficient sets 520. Additionally, compression parameters may include information that limits the extent to which the AC-3 data stream 220 may be modified to ensure that the media content conveyed via the AC-3 data stream 220 is of a sufficiently high quality level. The mixing device 200 subsequently uses the compression information identified by the unpacking unit 420 to mix the uncompressed auxiliary digital bit stream 210 into the AC-3 data stream 220 thereby ensuring that the mixing operation is performed in a manner consistent with the compression information supplied in the compressed main digital bit stream 220.

As described in detail in the AC-3 compression standard, a mantissa and an exponent are used to represent each original MDCT coefficient. The AC-3 compression standard employs techniques to reduce the number of bits used to represent each original MDCT coefficient. Psycho-acoustic masking is one factor that may be utilized by these techniques. For example, the presence of audio energy $E_k$ either at a particular frequency k (e.g., a tone) or spread across a band of frequencies proximate to the particular frequency k (e.g., a noise-like characteristic) creates a masking effect. That is, the human ear is unable to perceive a change in energy in a spectral region either at a frequency k or spread across the band of frequencies proximate to the frequency k if that change is less than a given energy threshold $\Delta E_k$. Because of this characteristic of the human ear, an MDCT coefficient $m_k$ associated with the frequency k may be quantized with a step size related to $\Delta E_k$ without risk of causing any perceptible changes to the audio content. For the AC-3 data stream 220, each original MDCT coefficient $m_k$ is represented as a mantissa $M_k$ and an exponent $X_k$ such that $m_k = M_k \cdot 2^{-X_k}$, where $2^{-X_k}$ represents the quantization step size for the coefficient $m_k$. The number of bits used to represent the mantissa $M_k$ of each original MDCT coefficient of the original MDCT coefficient sets 520 may be determined based on known quantization look-up tables published in the AC-3 compression standard, such as the example quantization look-up table 600 of FIG. 6. In the example of FIG. 6, the quantization look-up table 600 provides mantissa codes or bit patterns and corresponding mantissa values for MDCT coefficients represented by a four-bit number. As described in detail below, the mantissa $M_k$ may be modified to represent an MDCT coefficient resulting from mixing the uncompressed auxiliary digital bit stream 210 with the AC-3 data stream 220.

Returning to FIGS. 4 and 5, the modification unit 430 is configured to perform an inverse transform of each of the original MDCT coefficient sets 520 to generate time-domain audio blocks 530, shown by way of example as TA0', ..., TA3", TA4', TA4", TA5', TA5", TB0', TB0", TB1', TB1", ..., and TB5' (TA0" through TA3' and TB2' through TB4" are not shown). The modification unit 430 performs inverse transform operations to generate sets of previous (old) time-domain audio blocks (which are represented as prime blocks) and sets of current (new) time-domain audio blocks (which are represented as double-prime blocks) associated with the 256-sample time-domain audio blocks that were concatenated to form the original MDCT coefficient sets 520 of the AC-3 data stream 220. For example, the modification unit 430 performs an inverse transform on the original MDCT coefficient set MA5 to generate time-domain blocks TA4" and TA5', the original MDCT coefficient set MB0 to generate TA5" and TB0', the original MDCT coefficient set MB1 to generate TB0" and TB1', etc. Then, the modification unit 430 generates reconstructed time-domain audio blocks 540, which provide a reconstruction of the original time-domain audio blocks that were compressed to form the AC-3 data stream 220. To generate the reconstructed time-domain audio blocks 540, the modification unit 430 may add time-domain audio blocks 530 based on, for example, the known Princen-Bradley time domain alias cancellation (TDAC) technique as described in Princen et al., *Analysis/Synthesis Filter Bank Design Based on Time Domain Aliasing Cancellation*, Institute of Electrical and Electronics Engineers (IEEE) Transactions on Acoustics, Speech and Signal Processing, Vol. ASSP-35, No. 5, pp. 1153-1161 (1986), which is incorporated herein by reference in its entirety. For example, the modification unit 430 may reconstruct the time-domain audio block A5 of FIG. 3 (corresponding to TA5R) by adding the prime time-domain audio block TA5' and the double-prime time-domain audio block TA5" using the Princen-Bradley TDAC technique. Likewise, the modification unit 430 may reconstruct the time-domain audio block B0 (corresponding to TB0R) by adding the prime audio block TB0' and the double-prime audio block TB0" using the Princen-Bradley TDAC technique. In this manner, the original time-domain audio blocks used to form the AC-3 data stream 220 are reconstructed to enable the uncompressed auxiliary digital bit stream 210 to be mixed directly into the AC-3 data stream 220.

The modification unit 430 is also configured to mix the uncompressed auxiliary digital bit stream 210 into the reconstructed time-domain audio blocks 540 to generate mixed time-domain audio blocks 550, shown by way of example as TA0X, ..., TA4X, TA5X, TB0X, TB1X, ..., and TB5X (blocks TA1X, TA2X, TA3X, TB2X, TB3X and TB4X are not shown). The modification unit 430 may implement the mixing process by adding the time-domain audio samples included in the uncompressed auxiliary digital bit stream 210 with corresponding time-domain audio samples in the concatenated reconstructed time-domain audio blocks 540 to generate the mixed time-domain audio blocks 550. Additionally, the modification unit 430 may be configured to attenuate time-domain audio samples in either or both of the uncompressed auxiliary digital bit stream 210 and the reconstructed time-domain audio blocks 540 prior to the addition operation. For example, in the case in which the AC-3 data stream 220 corresponds to a MAS and the uncompressed auxiliary digital bit stream 210 corresponds to an AAS, the modification unit 430 may be configured to attenuate the time-domain samples in the reconstructed time-domain audio blocks 540 corresponding to the MAS by an attenuation factor (e.g., 3 dB to 10 dB) prior to the addition operation. Such an attenuation will allow the AAS to be the dominant audio component of the mixed audio signal, but still allow the MAS to be heard at a low, but perceptible, level.

Returning to FIGS. 4 and 5, based on the mixed time-domain audio blocks 550, the modification unit 430 generates intermediate mixed MDCT coefficient sets 560, shown by way of example as MA0I, ..., MA4I, MA5I, MB0I, ..., and MB5I (blocks MA1I, MA2I, MA3I, MB1I, MB2I, MB3I and MB4I are not shown). Following the example described above, the modification unit 430 generates the intermediate mixed MDCT coefficient set MA5I based on the mixed time-domain audio blocks TA5X and TB0X. Specifically, the modification unit 430 concatenates the mixed time-domain audio blocks TA5X and TB0X to form a 512-sample concatenated audio block and converts the 512-sample concatenated audio block into the intermediate mixed MDCT coefficient set MA5I which, as described in greater detail below, may be used to modify the original MDCT coefficient set MA5 to generate the output mixed MDCT coefficient set MA5X.

The difference between the original MDCT coefficient sets 520 and the intermediate mixed MDCT coefficient sets 560 represents a change in the AC-3 data stream 220 corresponding to mixing the uncompressed auxiliary digital bit stream 210 with the AC-3 data stream 220. Thus, it is possible to generate the output mixed MDCT coefficient sets 570, shown by way of example as MA0X, ..., MA4X, MA5X, MB0X, ..., and MB5X (blocks MA1X, MA2X, MA3X, MB1X, MB2X, MB3X and MB4X are not shown), based on the format of the original MDCT coefficient sets 520 and, thus, the compression associated with the original MDCT coefficient sets 520. For example, in connection with FIG. 6, the modification unit 430 may represent the mixed MDCT coefficient set MA5X in a mantissa and exponent format using the exponents associated with the corresponding original MDCT coefficient set MA5 and mantissas based on the corresponding intermediate mixed MDCT coefficient set MA5I. Furthermore, quantization look-up tables (e.g., the look-up table 600 of FIG. 6) corresponding to the original MDCT coefficient sets 520 may be used to quantize the mantissa values of the intermediate mixed MDCT coefficient 560 to generate the mantissa values for the MDCT coefficients of the mixed MDCT coefficient sets 570. A person of ordinary skill in the art will recognize that the resulting quantized mixed mantissa values represent the change in or augmentation of the AC-3 data stream 220 as a result of mixing in the uncompressed auxiliary digital bit stream 210. In this example implementation, the exponents of the original MDCT coefficients are used to generate the corresponding mixed MDCT coefficients of the mixed MDCT coefficient sets 570. Changing the exponents might require that the underlying compressed signal representation be recomputed, thereby requiring the compressed signal to undergo a true decompression/compression cycle. To avoid a decompression/compression cycle, if a modification of only the mantissa is insufficient to fully represent the difference between a mixed and an original MDCT coefficient, the affected MDCT mantissa is set to a maximum or minimum value, as appropriate.

Turning to FIG. 6, the example quantization look-up table 600 includes mantissa codes and mantissa values for a fifteen-level quantization of an example mantissa $M_k$ in the range of −0.9333 to +0.9333. While the example quantization look-up table 600 provides mantissa information associated with MDCT coefficients that are represented using four bits, the AC-3 compression standard provides quantization look-up tables associated with other suitable numbers of bits per MDCT coefficient. To illustrate one example manner in which the modification unit 430 may generate a particular mixed MDCT coefficient, consider an original MDCT coefficient $m_k$ with a mantissa $M_k$ contained in the original MDCT coefficient set MA5. Assume the original mantissa value $M_k$ is −0.2666 (i.e., −4/15). Using the quantization look-up table 600, the mantissa code corresponding to the original MDCT coefficient $m_k$ in the original MDCT coefficient set MA5 is determined to be 0101. Next, assume that the mixed MDCT coefficient set MA5X includes a mixed MDCT coefficient $xm_k$ with a mantissa value $XM_k$. Further, assume the intermediate mantissa value of the corresponding intermediate mixed MDCT coefficient set MA5I is −0.4300, which lies between the mantissa codes of 0011 and 0100. In other words, mixing the uncompressed auxiliary bit stream 210 with the AC-3 bit stream 220, in this example, results in a difference of −0.1667 between the original mantissa value of −0.2666 and the mixed mantissa value of −0.4300.

To mix the uncompressed auxiliary bit stream 210 with the AC-3 data stream 220, the modification unit 430 may represent the mixed MDCT coefficient set MA5X as a modification of the original MDCT coefficients in the original MDCT coefficient set MA5. Continuing with the above example, either mantissa code 0011 or mantissa code 0100 may replace the mantissa code 0101 associated with the MDCT coefficient $m_k$ to represent the mixed MDCT coefficient $xm_k$ because the intermediate mixed mantissa associated with the corresponding mixed MDCT coefficient $xm_k$ lies between the mantissa codes of 0011 and 0100 (because the intermediate mantissa value corresponding to the mixed MDCT coefficient $xm_k$ is −0.4300). The mantissa value corresponding to the mantissa code 0011 is −0.5333 (i.e., 8/15) and the mantissa value corresponding to the mantissa code 0100 is −0.4 (i.e., −6/15). In this example, the modification unit 430 selects the mantissa code 0100 to represent the mixed MDCT coefficient $xm_k$ because the mantissa value −0.4 corresponding to the mantissa code 0100 is closest to the desired intermediate mixed mantissa value −0.4300. As a result, the new mantissa bit pattern of 0100, which corresponds to the mixed mantissa $XM_k$ of the mixed MDCT coefficient $xm_k$, replaces the original mantissa bit pattern of 0101. Likewise, each of the original MDCT coefficients in the original MDCT coefficient set MA5 may be modified in the manner described above to generate the corresponding mixed MDCT coefficient in the mixed MDCT coefficient set MA5X. Furthermore, if an intermediate mixed mantissa value is outside the quantization range of mantissa values (i.e., greater than 0.9333 or less than −0.9333), either the positive limit of 1110 or the negative limit of 0000 is selected as the output mixed mantissa code, as appropriate. Additionally, and as discussed above, while the mantissa codes associated with each original MDCT coefficient of an original MDCT coefficient set may be modified as described above, the exponents associated with the original MDCT coefficients remain unchanged in the generation of the corresponding mixed MDCT coefficient.

Returning to FIGS. 4 and 5, the repacking unit 440 is configured to repack the mixed MDCT coefficient sets 570 associated with each frame of the AC-3 data stream 220 to generate the compressed mixed digital bit stream 230. In particular, the repacking unit 440 identifies the position of each original MDCT coefficient set 520 within a frame of the AC-3 data stream 220 so that the corresponding mixed MDCT coefficient set 570 can be generated based on modifying the identified original MDCT coefficient set 520. To rebuild a mixed version of Frame A, for example, the repacking unit 440 may identify the position of and modify the original MDCT coefficient sets MA0 to MA5 to generate the corresponding mixed MDCT coefficient sets MA0X to MA5X in the corresponding identified positions. Using the unpacking, modifying, and repacking processes described herein, the AC-3 data stream 220 remains a compressed digital bit stream while the auxiliary digital bit stream 210 is mixed with the AC-3 data stream 220. As a result, the mixing device 200 mixes the auxiliary digital bit stream 210 with the AC-3 data stream 220 without additional decompression/compression cycles that may degrade the quality of the media content in the AC-3 data stream 220.

Figure 7:
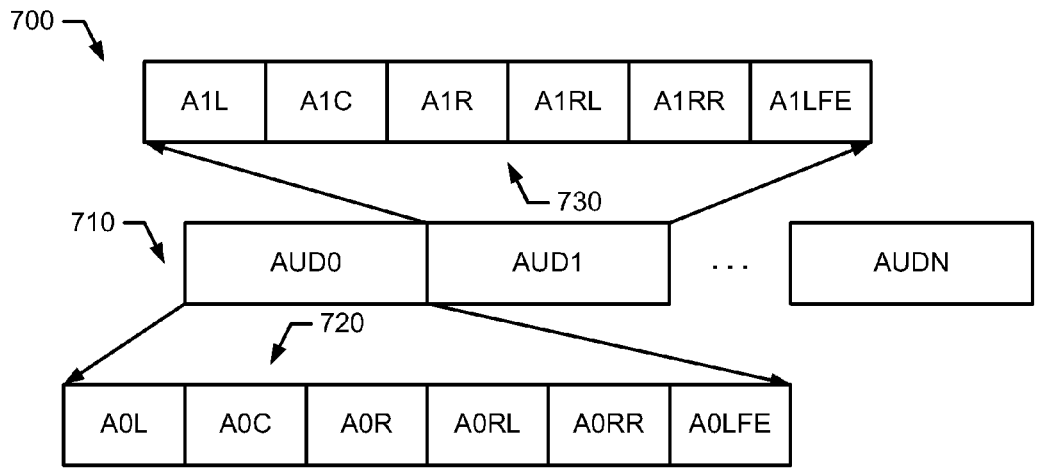
FIG. 7 depicts an example multiple-channel compressed digital audio bit stream to be processed by the example mixing device of FIG. 4.
Figure 8:
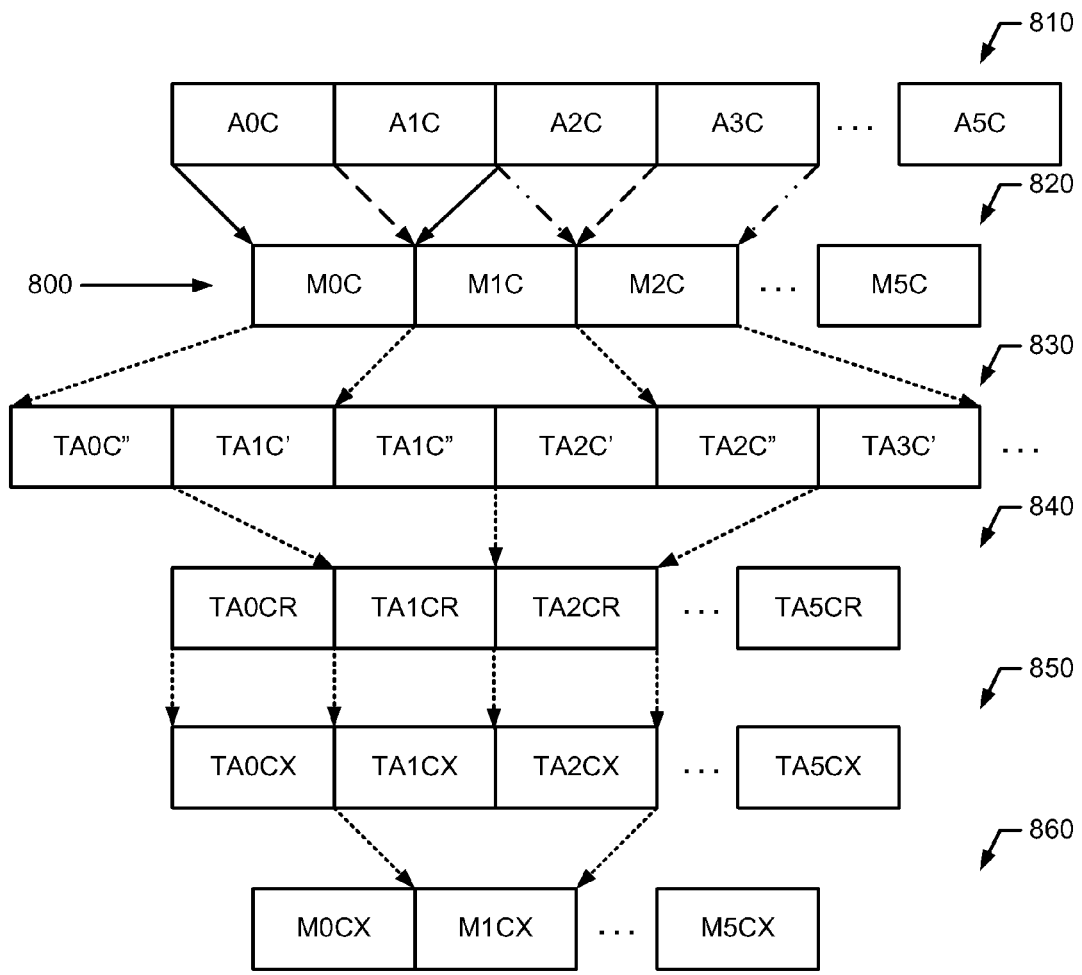
FIG. 8 depicts an example sequence of operations to be performed on the example compressed digital audio bit stream of FIG. 7 by the example mixing device of FIG. 4.

For simplicity, the AC-3 data stream 220 is described in connection with FIG. 5 to include a single channel. However, the methods and apparatus disclosed herein may be applied to compressed digital data streams having audio blocks associated with multiple channels, such as 5.1 channel audio (i.e., five full-bandwidth channels and one low frequency effects channel), as described below in connection with FIGS. 7 and 8. In the example of FIG. 7, an uncompressed digital bit stream format 700 may include a plurality of audio block sets 710. Each of the audio block sets 710 may include audio blocks associated with multiple channels 720 and 730 including, for example, a front left channel, a center channel, a front right channel, a rear left channel, a rear right channel, and a low-frequency effect (LFE) channel (e.g., a sub-woofer channel). For example, the audio block set AUD0 includes an audio block A0L associated with the front left channel, an audio block A0C associated with the center channel, an audio block A0R associated with the front right channel, an audio block A0RL associated with the rear left channel, an audio block A0RR associated with the rear right channel, and an audio block A0LFE associated with the LFE channel. Similarly, the audio block set AUD1 includes an audio block A1L associated with the front left channel, an audio block A1C associated with the center channel, an audio block A1R associated with the front right channel, an audio block A1RL associated with the rear left channel, an audio block A1RR associated with the rear right channel, and an audio block A1LFE associated with the LFE channel.

Each of the audio blocks associated with a particular channel in the audio block sets 710 may be compressed in a manner similar to that described above in connection with FIG. 3. For example, the audio blocks associated with the center channel 810 of FIG. 8, corresponding to the center channel of FIG. 7 and shown by way of example as A0C, A1C, A2C, and A3C, ... , A5C (A4C is not shown), may be transformed to generate the MDCT coefficient sets 820 associated with a compressed center channel digital bit stream 800. As noted above, each of the MDCT coefficient sets 820 may be derived from a 512-sample audio block formed by concatenating a preceding (old) 256-sample audio block and a current (new) 256-sample audio block. The MDCT algorithm may then process the time-domain audio blocks 810 (e.g., A0C through A5C) to generate the MDCT coefficient sets (e.g., M0C through M5C).

In applications involving the mixing of an AAS with an MAS corresponding to 5.1 channel audio, it may be preferable to mix the AAS digital bit stream with the center channel of the MAS 5.1 channel audio bit stream. In such a case, the compressed center channel digital bit stream 800 corresponds to the compressed main digital bit stream 220 of FIG. 2, and the mixing device 200 of FIG. 4 may be used to mix the auxiliary digital bits stream 210 with the compressed center channel digital bit stream 800. The mixing device 200 may perform the mixing operation in a manner similar to the process described above in connection with FIGS. 5 and 6. For example, based on the MDCT coefficient sets 820 of the compressed center channel digital bit stream 800, the acquisition unit 410 acquires a plurality of frames (not shown) and header information associated with each of the frames as described above. The header information includes compression information associated with the compressed center channel digital bit stream 800. For each of the frames, the unpacking unit 420 unpacks the original MDCT coefficient sets 820 to determine the compression information associated with the original MDCT coefficient sets 820. For example, the unpacking unit 420 may identify the number of bits used by the original compression process to represent the mantissa of each original MDCT coefficient in each of the original MDCT coefficient sets 820. Such compression information may be used to mix the auxiliary digital bit stream 210 with the compressed center channel digital bit stream 800 as described above in connection with FIGS. 5 and 6. The modification unit 430 then generates inverse transformed time-domain audio blocks 830, shown by way of example as TA0C", TA1C', TA1C", TA2C', TA2C", and TA3C'. The time-domain audio blocks 830 include a set of previous (old) time-domain audio blocks (which are represented as prime blocks) and a set of current (new) time-domain audio blocks (which are represented as double-prime blocks). By adding the corresponding prime blocks and double-prime blocks based on, for example, the Princen-Bradley TDAC technique, the original time-domain audio blocks compressed to form the compressed center channel digital bit stream 800 may be reconstructed to form the reconstructed time-domain audio blocks 840. For example, the modification unit 430 may add the time-domain audio blocks TA1C' and TA1C" to reconstruct the time-domain audio block A1C (i.e., TA1CR). Likewise, the modification unit 430 may add the time-domain audio blocks TA2C' and TA2C" to reconstruct the time-domain audio block A2C (i.e., TA2CR).

To mix the auxiliary digital bits stream 210 with the compressed center channel digital bit stream 800, the modification unit 430 mixes the auxiliary digital bit stream 210 with the reconstructed time-domain audio blocks 840 to generate the mixed time-domain audio blocks 850. For example, the modification unit 430 may mix the auxiliary digital bit stream 210 into the reconstructed time-domain audio block TA1CR to generate the mixed time-domain audio block TA1CX.

Based on the mixed time-domain audio blocks 850, the modification unit 430 may generate the mixed MDCT coefficient sets 860. For example, the modification unit 430 may concatenate the mixed time-domain audio blocks TA1CX and TA2CX to generate an intermediate mixed MDCT coefficient set M1CI (not shown) corresponding to the mixed MDCT coefficient M1CX. As discussed above in connection with FIGS. 5 and 6, the modification unit 430 modifies the original MDCT coefficient sets 820 to generate corresponding mixed MDCT coefficient sets 860 based on intermediate mixed MDCT coefficients (not shown). For example, the modification unit 430 may use the desired values of the mixed MDCT coefficient set M1CI to modify the original mantissas of the MDCT coefficient set M1C to generate the mixed MDCT coefficient set M1CX. The repacking unit 440 may then repack the mixed MDCT coefficient sets 860 to generate the compressed mixed digital bit stream 230 corresponding to mixing the auxiliary digital bit stream 210 with the compressed center channel digital bit stream 800.

Figure 9:
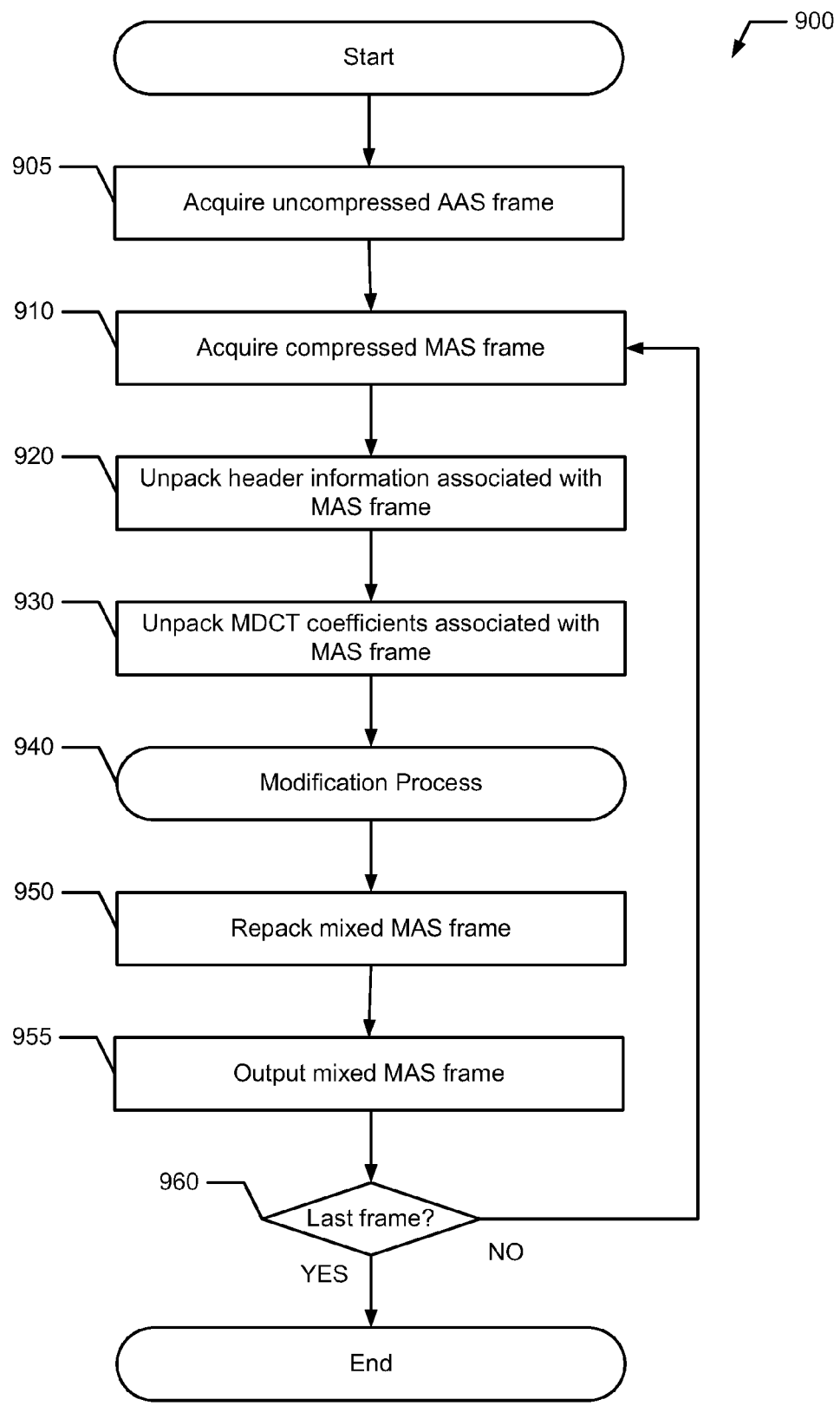
FIG. 9 is a flowchart representative of an example process that may be used to implement the example mixing device of FIG. 4.
Figure 10:
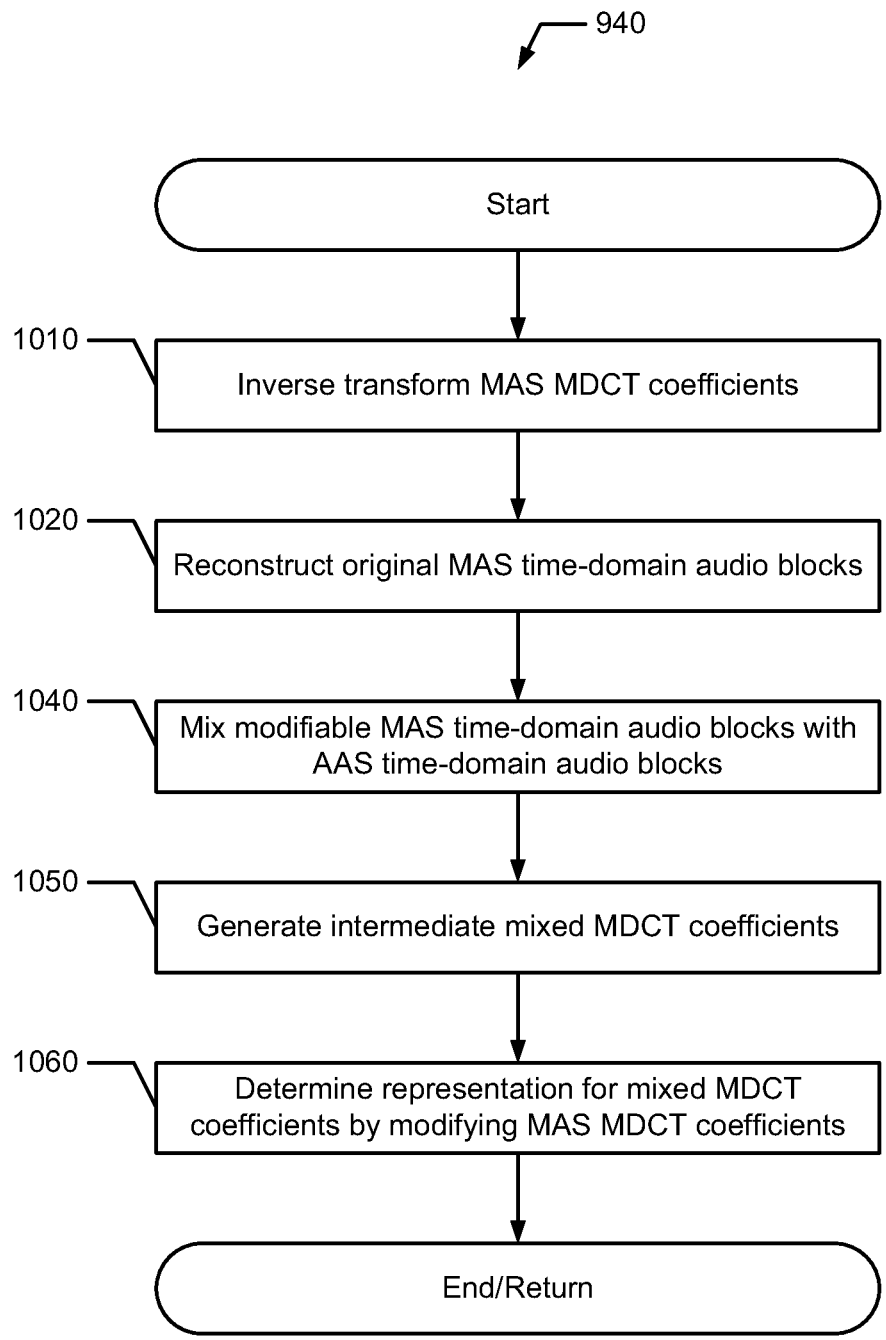
FIG. 10 is a flowchart representative of a first example modification process for use by the example process of FIG. 9.
Figure 11:
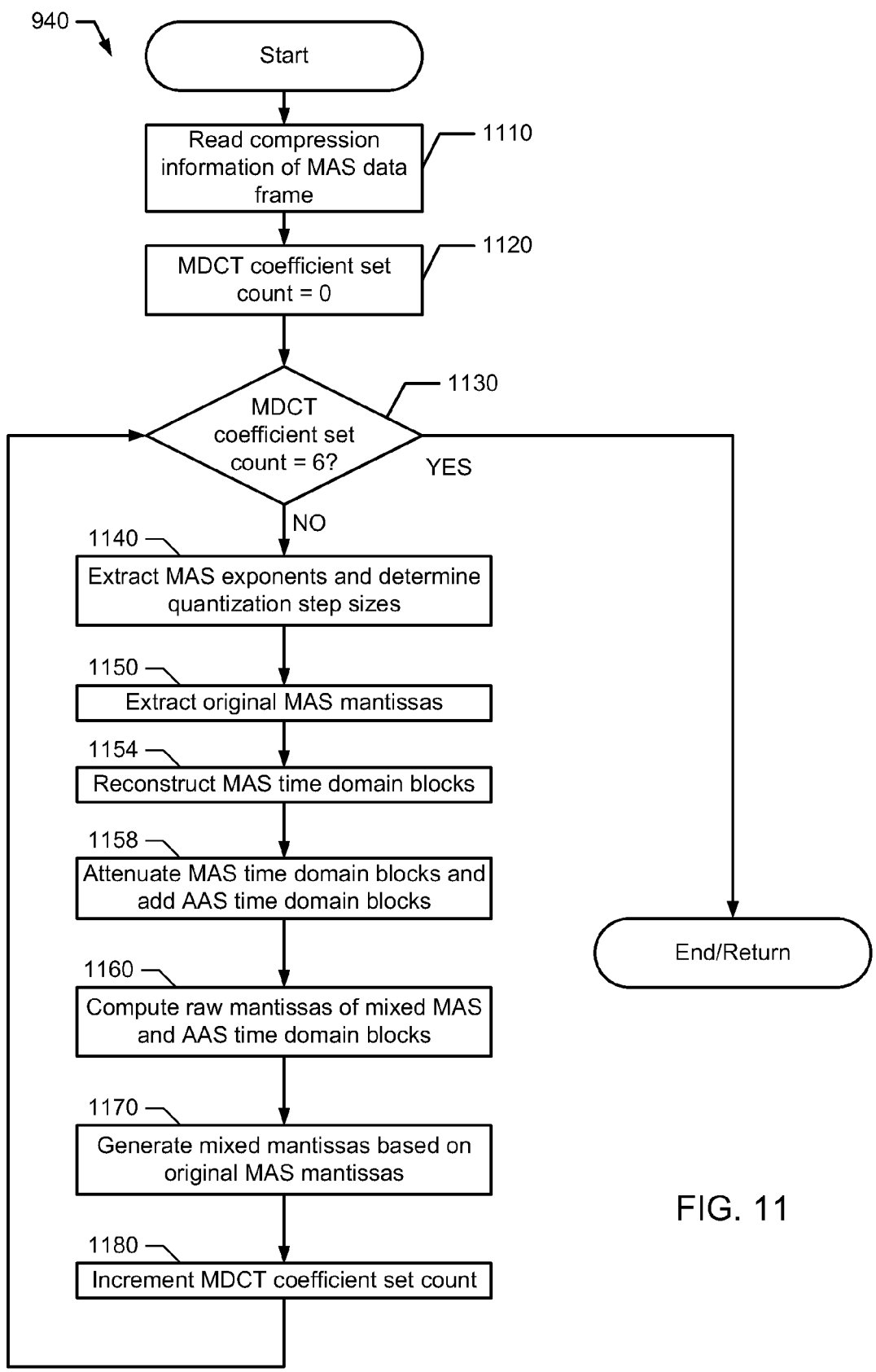
FIG. 11 is a flowchart representative of a second example modification process for use by the example process of FIG. 9 and tailored to operate on the example compressed digital audio bit streams of FIG. 3 or 7.

Flowcharts representative of example processes for implementing the example mixing device 200 of FIG. 4 are shown in FIGS. 9 through 11. In these examples, the processes represented by the flowcharts may be implemented by sets of machine readable instructions that may comprise one or more programs for execution by a processor, such as the processor 2020 shown in the example computer 2000 discussed below in connection with FIG. 15. The one or more processes may be embodied in software stored on a tangible medium such as a CD-ROM, a floppy disk, a hard drive, a DVD, or a memory 2030 associated with the processor 2020, but persons of ordinary skill in the art will readily appreciate that the program or programs and/or portions thereof could alternatively be executed by a device other than the processor 2020 and/or embodied in firmware or dedicated hardware in a well-known manner. For example, any or all of the mixing device 200, the acquisition unit 410, the unpacking unit 420, the modification unit 430 and/or the repacking unit 440 could be implemented by any combination of software, hardware, and/or firmware. Further, although the example processes are described with reference to the flowcharts illustrated in FIGS. 9 through 11, persons of ordinary skill in the art will readily appreciate that many other methods of implementing the example methods and apparatus described herein may alternatively be used. For example, with reference to the flowcharts illustrated in FIGS. 9 through 11, the order of execution of the blocks may be changed, and/or some of the blocks described may be changed, eliminated, combined and/or subdivided into multiple blocks.

A flowchart illustrating an example process 900 to implement the example mixing device 200 of FIG. 4 is shown in FIG. 9. In the example of FIG. 9, the example process 900 begins at block 905 at which the acquisition unit 410 acquires a frame associated with the uncompressed auxiliary digital bit stream 210 of FIG. 2 corresponding to an AAS (hereinafter referred to as the "uncompressed AAS frame" in the descriptions of FIGS. 9-11). Next, control passes to block 910 at which the acquisition unit 410 acquires a frame associated with the compressed main digital bit stream 220 corresponding to a MAS (hereinafter referred to as the "compressed MAS frame" in the descriptions of FIGS. 9-11), such as Frame A of FIG. 5. The acquired compressed MAS frame may include a plurality of original MDCT coefficient sets formed by overlapping and concatenating a plurality of audio blocks. In accordance with the AC-3 compression standard, for example, a compressed MAS frame may include six MDCT coefficient sets (i.e., six "audblks," wherein each MDCT coefficient set corresponds to an AC-3 audblk), such as the original MDCT coefficient sets 520 of FIG. 5. After the compressed MAS frame is acquired at block 910, control passes to block 920 at which the acquisition unit 410 also identifies header information associated with the compressed MAS frame. For example, the acquisition unit 410 may determine the number of channels associated with the compressed main digital bit stream 220 corresponding to the acquired MAS frame.

Control then proceeds to block 930 at which the unpacking unit 420 unpacks the plurality of original MDCT coefficient sets 520 included in the acquired compressed MAS frame to determine compression information associated with the original compression process used to generate the compressed MAS frame. In particular, the unpacking unit 420 identifies the mantissa $M_k$ and the exponent $X_k$ of each original MDCT coefficient $m_k$ of each of the original MDCT coefficient sets 520. The exponents of the original MDCT coefficients may then be grouped in a manner compliant with the AC-3 compression standard. The unpacking unit 420 also determines the number of bits used to represent the mantissa of each of the original MDCT coefficients so that a suitable quantization look-up table specified by the AC-3 compression standard may be used to modify the plurality of original MDCT coefficient sets as described above in connection with FIG. 6. Control then proceeds to block 940 to implement the modification process, which is described in greater detail below in connection with FIG. 10.

As illustrated in FIG. 10, the modification process 940 begins at block 1010 at which the modifying unit 430 performs an inverse transform of the original MDCT coefficient sets 520 to generate inverse transformed time-domain audio blocks, such as the time-domain audio blocks 530. In particular, the modification unit 430 generates a previous (old) time-domain audio block (which, for example, is represented as a prime block in FIG. 5) and a current (new) time-domain audio block (which is represented as a double-prime block in FIG. 5) associated with each of the 256-sample original time-domain audio blocks 530 used to generate the corresponding original MDCT coefficient set. As described above in connection with FIG. 5, for example, the modification unit 430 may generate TA4" and TA5' from the MDCT coefficient set MA5, TA5" and TB0' from the MDCT coefficient set MB0, and TB0" and TB1' from the MDCT coefficient set MB1. Control then proceeds to block 1020 at which the modification unit 430 adds corresponding old and new blocks to reconstruct time-domain audio blocks based on, for example, the Princen-Bradley TDAC technique to generate reconstructed time-domain audio blocks, such as the reconstructed time-domain audio block 540 of FIG. 5. Following the above example, the old block TA5' and the new block TA5" may be added to reconstruct the time-domain audio block A5 (i.e., the reconstructed time-domain audio block TA5R) while the prime block TB0' and the double-prime block TB0" may be added to reconstruct the time-domain audio block B0 (i.e., the reconstructed time-domain audio block TB0R).

To mix the uncompressed AAS frame acquired at block 905 of FIG. 9 with the compressed MAS frame acquired at block 910, control proceeds to block 1040 at which the modification unit 430 mixes the uncompressed AAS frame with the reconstructed time-domain audio blocks derived from the compressed MAS frame. For example, the modification unit 430 may add samples from the uncompressed AAS frame to the reconstructed time-domain audio block TA5R to generate the mixed time-domain audio block TA5X of FIG. 5. The modification unit 430 may also attenuate either or both of the reconstructed time-domain audio blocks corresponding to the compressed MAS frame or the uncompressed AAS frame prior to the addition process to generate the mixed time-domain audio blocks 550. Control then proceeds to block 1050 at which, based on the mixed time-domain audio blocks 550, the modification unit 430 generates intermediate mixed MDCT coefficient sets, such as the intermediate mixed MDCT coefficient sets 560 of FIG. 5. As noted above, two mixed time-domain audio blocks 550, where each block includes 256 samples, may be used to generate an intermediate mixed MDCT coefficient set 560. For example, the mixed time-domain audio blocks TA5X and TB0X may be concatenated and then used to generate the intermediate mixed MDCT coefficient set MA5I.

Next, control proceeds to block 1060 at which the modification unit 430 determines an output mixed MDCT coefficient set 570 based on modifying the original MDCT coefficient set 520 corresponding to the compressed MAS frame acquired at block 910 of FIG. 9. For example, based on the compression information determined at block 930 of FIG. 9 and associated with the compressed digital data stream 220 corresponding to the compressed MAS frame, the modification unit 430 calculates the mantissa value associated with each of the mixed MDCT coefficients in the mixed MDCT coefficient set MA5X as described above in connection with FIGS. 4-6. In this manner, the modification unit 430 can modify the original MDCT coefficient sets 520 to determine mixed MDCT coefficient sets 570 representing the mixing of the auxiliary digital bit stream 210 corresponding to the uncompressed AAS frame with the compressed main digital bit stream 220 corresponding to the compressed MAS frame. Following the above example, the modification unit 430 may modify the original MDCT coefficient set MA5 to determine a representation for the mixed MDCT coefficient set MA5X based on the intermediate mixed MDCT coefficient set MA5I. For example, the modification unit 430 may replace a mantissa of an original MDCT coefficient in the MDCT coefficient set MA5 with a quantized intermediate mantissa of a corresponding intermediate mixed MDCT coefficient from the intermediate mixed MDCT coefficient set MA5I to generate a mixed MDCT coefficient in the mixed MDCT coefficient set MA5X. Alternatively, the modification unit 430 may compute the difference between the mantissa codes associated with the original MDCT coefficient and the corresponding intermediate mixed MDCT coefficient and modify the original MDCT coefficient based on the difference to generate the output mixed MDCT coefficient set. In either case, after modifying the original MDCT coefficient sets to generate the mixed MDCT coefficient sets, the modification process 940 terminates and returns control to block 950 of FIG. 9.

Referring back to FIG. 9, at block 950 the repacking unit 440 repacks the mixed MDCT coefficient sets 570 to generate the compressed mixed digital bit stream 230. The repacking unit 440 identifies the position of the MDCT coefficient sets within the frame so that the mixed MDCT coefficient sets may be substituted in the positions of the original MDCT coefficient sets to rebuild the frame. Control then proceeds to block 955 at which the repacking unit 440 outputs the resulting repacked frame to produce the compressed mixed digital bit stream 230. Then, at block 960, if the mixing device 200 determines that additional frames of the compressed main digital bit stream 220 need to be processed, control returns to block 910. If, however, all frames of the compressed main digital bit stream 220 have been processed, the process 900 terminates.

As noted above, known mixing techniques typically decompress a compressed main digital bit stream into uncompressed time-domain samples, mix an auxiliary digital bit stream with the uncompressed main digital bit stream, and recompress the mixed time-domain samples into a compressed mixed digital bit stream. In contrast, in the example processes 900 of FIG. 9, the compressed main digital bit stream 220 remains compressed during the example unpacking, modifying, and repacking processes described herein. As a result, the auxiliary digital bit stream 210 is mixed into the compressed main digital bit stream 220 without additional decompression/compression cycles that may degrade the quality of the content in the compressed mixed digital data stream 230.

To further illustrate the example modification process 940 of FIGS. 9 and 10, FIG. 11 depicts a detailed flowchart of an AC-3 data frame modification process 940 to modify an AC-3 data frame of a MAS compressed digital bit stream 220 to reflect mixing the MAS digital bit stream 220 with an AAS digital bit stream 210. The example AC-3 data frame modification process 940 begins at block 1110 with the unpacking unit 420 of the mixing device 200 reading the compression information of the acquired AC-3 frame determined, for example, at block 930 of FIG. 9. Next, control proceeds to block 1120 at which the modification unit 430 initializes an MDCT coefficient set count to zero. In the case in which an AC-3 frame is being processed, each AC-3 frame includes six MDCT coefficient sets having compressed-domain data (e.g., MA0, MA1, MA2, MA3, MA4 and MA5 of FIG. 5, which are also known as "audblks" in the AC-3 standard). Accordingly, at block 1130 the modification unit 430 of the mixing device 200 determines whether the MDCT coefficient set count is equal to six.

If at block 1130 the MDCT coefficient set count is not yet equal to six, thereby indicating that at least one more MDCT coefficient set requires processing, control proceeds to blocks 1140 and 1150 at which the modification unit 430 extracts the exponent and the mantissa, respectively, associated with an original MDCT coefficient of the AC-3 data frame corresponding to the MAS compressed digital bit stream 220 (e.g., the original mantissa $M_k$ described above in connection with FIG. 6). Control then proceeds to block 1154 at which the modification unit 430 reconstructs time-domain audio blocks corresponding to the AC-3 data frame of the MAS compressed digital bit stream 220 according to the example of FIGS. 5 and 6 above and based on the extracted mantissas and exponents. Next, at block 1158 the modification unit 430 mixes the reconstructed MAS time-domain audio blocks with corresponding audio blocks of the AAS digital bit stream 210. The modification unit 430 may attenuate either or both of the reconstructed MAS time-domain audio blocks or the AAS time-domain audio blocks prior to adding corresponding blocks together to perform the mixing process. The attenuation may be required to, for example, yield the desired audio amplitude relationship between the audio content of the MAS and the audio content of the AAS. In a typical scenario, the MAS may be attenuated by factor of 3 to 10 dB to allow voice-over content included in the AAS to be audible over the audio content of the MAS.

Next, control proceeds to block 1160 at which the modification unit 430 computes raw (intermediate) mixed mantissa values associated with the resulting mixed time-domain audio blocks produced at block 1158. Control then proceeds to block 1170 at which the modification unit 430 generates the final mixed mantissas by modifying the original mantissas associated with the original MDCT coefficients of the AC-3 data frame corresponding to the MAS compressed digital bit stream 220. For example, the final mixed mantissas may be determined by quantizing the raw mixed mantissas based on compression information associated with the original MDCT coefficients of the MAS compressed digital bit stream 220 (but limited within the range associated with the bit representation of the original mantissa). Control then proceeds to block 1180 at which the modification unit 430 increments the MDCT coefficient set count by one and control returns to block 1130.

Although the example process of FIG. 11 is described above to include six MDCT coefficient sets (e.g., the threshold of the MDCT coefficient set count is six), a process utilizing more or fewer MDCT coefficient sets could be used instead. However, in the example of FIG. 11, if at block 1130 the MDCT coefficient set count is equal to six, then all MDCT coefficient sets have been processed such that the mixing process for the current frame is complete. Control may then proceed, for example, to block 950 of FIG. 9 for subsequent processing.

Figure 12:
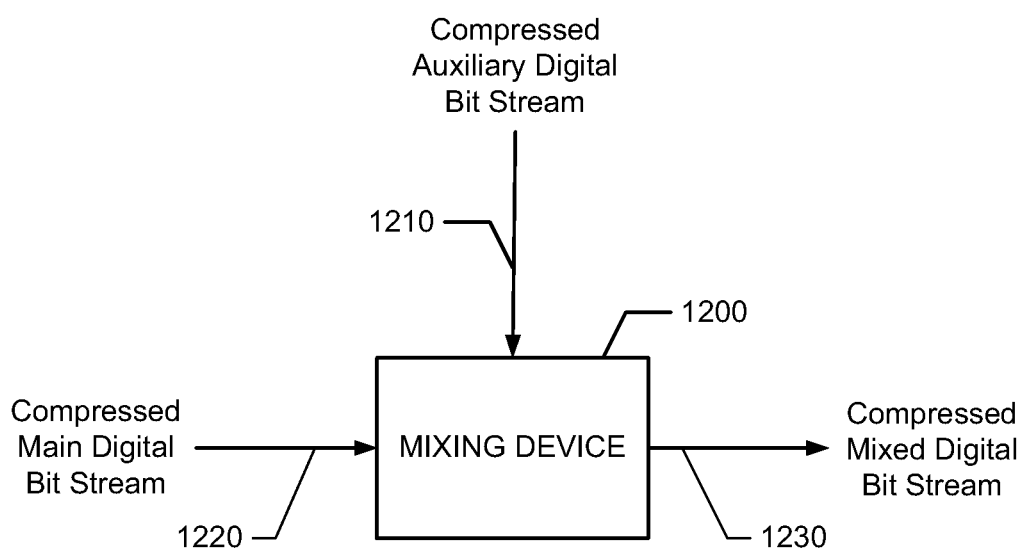
FIG. 12 depicts an alternative example mixing device for use in the example environment of FIG. 1.

FIG. 12 depicts an alternative example mixing device 1200 configured to mix a compressed auxiliary digital bit stream 1210 with a compressed main digital bit stream 1220 to generate a resulting compressed mixed digital bit stream 1230. The example mixing device 1200 of FIG. 12 may be used to implement the example mixing device 110 of FIG. 1, for example, in cases in which the local content 160 is formatted as a compressed digital bit stream (e.g., corresponding to the compressed auxiliary digital bit stream 1210) and the broadcast content provided by the broadcast network provider 120 is formatted as a compressed digital bit stream (e.g., corresponding to the compressed main digital bit stream 1220). As for the compressed main digital bit stream 220 of FIG. 2, the compressed main digital bit stream 1220 and the compressed auxiliary bit stream 1210 may be compressed according to, for example, an audio compression standard, such as the AC-3 compression standard and/or the MPEG-AAC compression standard, either of which may be used to process blocks of an audio signal using a predetermined number of digitized samples from each block. The sources of the compressed digital bit streams 1210 and 1220 (not shown) may be sampled at a rate of, for example, 48 kilohertz (kHz) to form audio blocks as described above in connection with examples of FIGS. 3 and 7.

Figure 13:
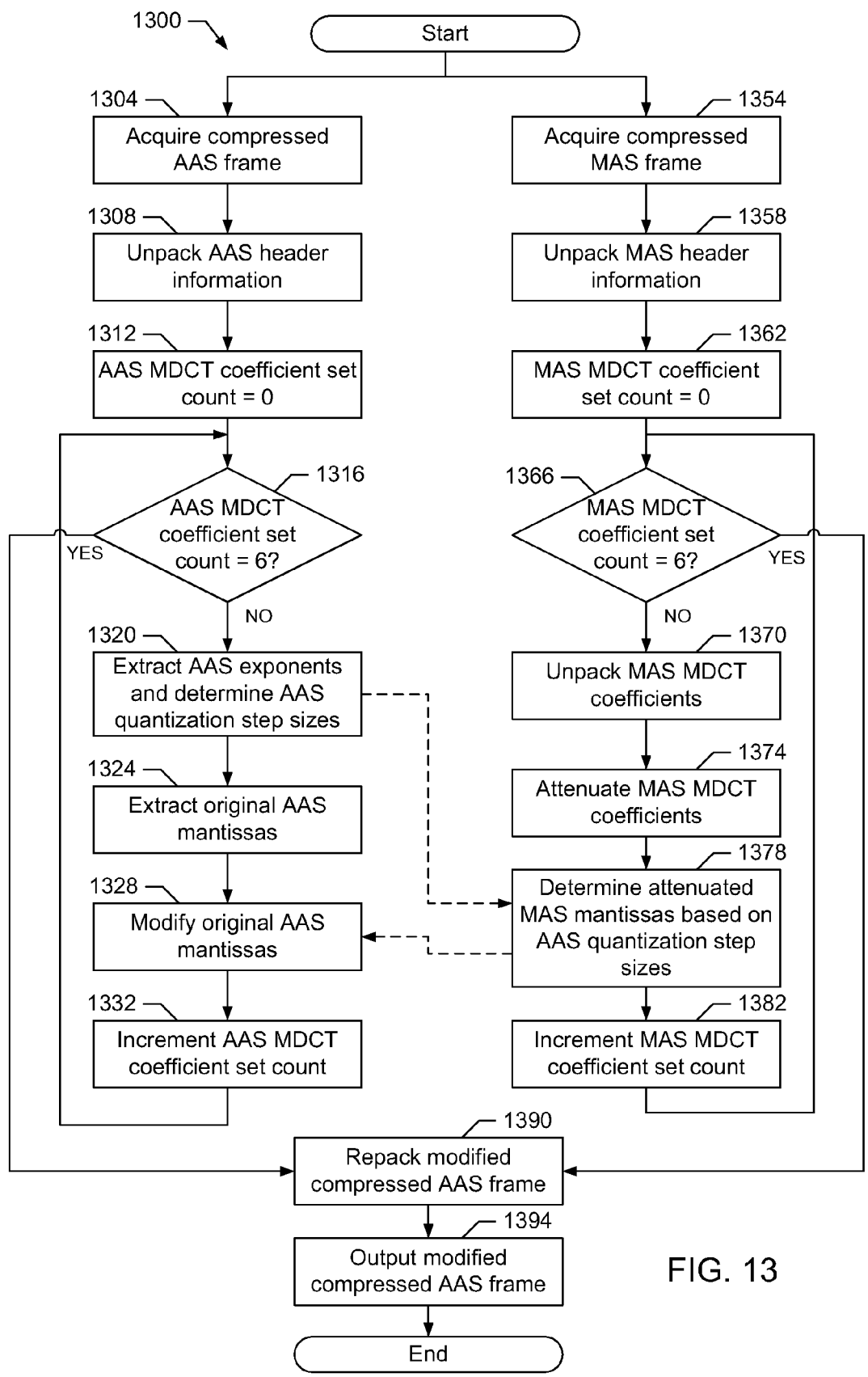
FIG. 13 is a flowchart representative of an example process that may be used to implement the example mixing device of FIG. 12.
Figures 14A, 14B:
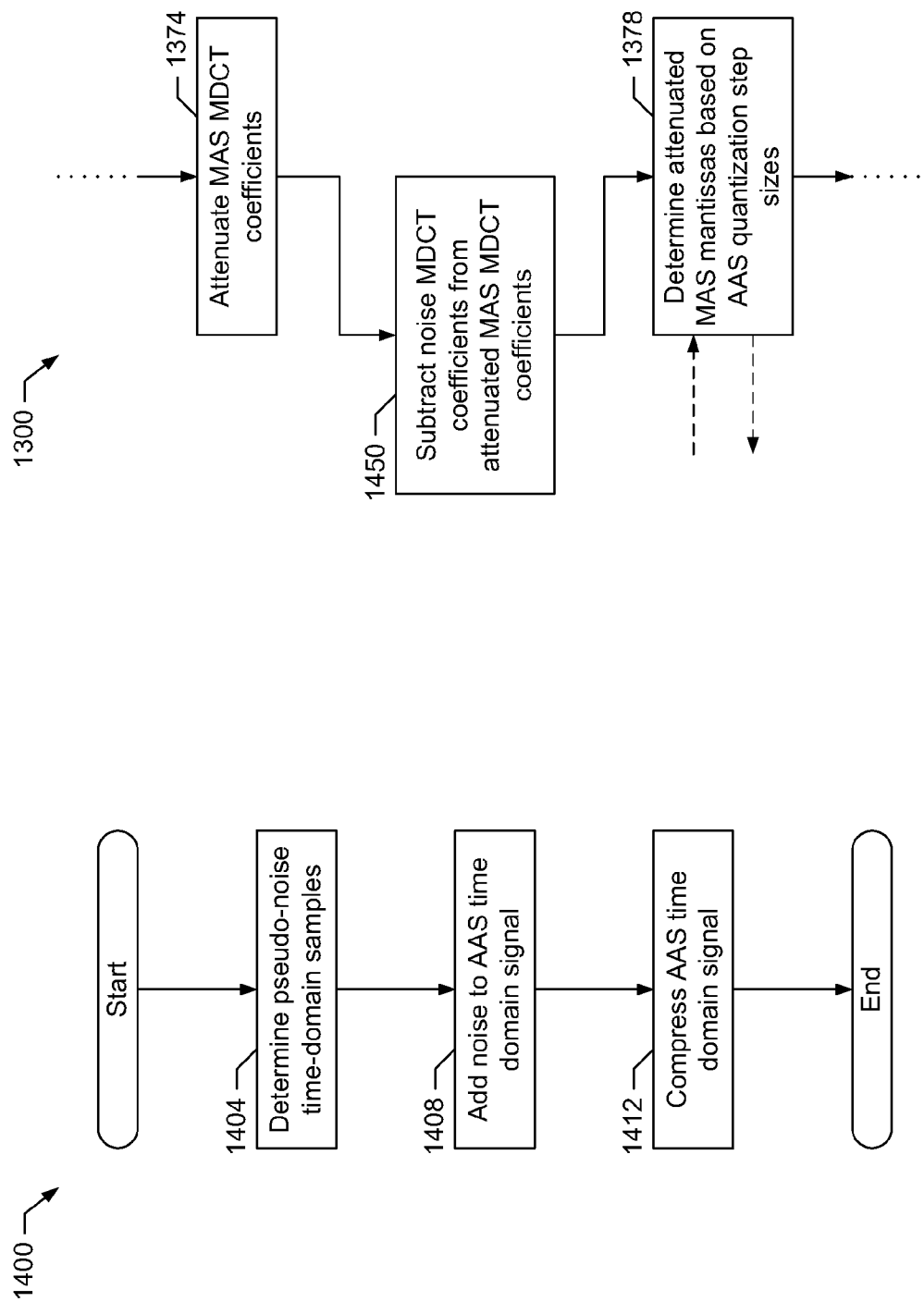
FIGS. 14A-B are flowcharts representative of an example enhancement to the example process of FIG. 13.

Flowcharts representative of example processes for implementing the example mixing device 1200 of FIG. 12 are shown in FIGS. 13 and 14A-B. In these examples, the processes represented by the flowcharts may be implemented by sets of machine readable instructions that may comprise one or more programs for execution by a processor, such as the processor 2020 shown in the example computer 2000 discussed below in connection with FIG. 15. The one or more processes may be embodied in software stored on a tangible medium such as a CD-ROM, a floppy disk, a hard drive, a DVD, or a memory 2030 associated with the processor 2020, but persons of ordinary skill in the art will readily appreciate that the program or programs and/or portions thereof could alternatively be executed by a device other than the processor 2020 and/or embodied in firmware or dedicated hardware in a well-known manner. For example, all or portions of the mixing device 1200 could be implemented by any combination of software, hardware, and/or firmware. Further, although the example processes are described with reference to the flowcharts illustrated in FIGS. 13 and 14A-B, persons of ordinary skill in the art will readily appreciate that many other methods of implementing the example methods and apparatus described herein may alternatively be used. For example, with reference to the flowcharts illustrated in FIGS. 13 and 14A-B, the order of execution of the blocks may be changed, and/or some of the blocks described may be changed, eliminated, combined and/or subdivided into multiple blocks.

A flowchart illustrating an example process 1300 to implement the example mixing device 1200 of FIG. 12 is shown in FIG. 13. As described in greater detail below, to combine an AAS source associated with the compressed auxiliary digital bit stream 1210 and a MAS source associated with the compressed main digital bit stream 1220 in the compressed domain according to the example of FIG. 13, the compressed audio frames associated with the AAS are treated as the primary audio source during the period in which the AAS is active. The MAS audio frames are then unpacked to obtain their MDCT coefficients. After attenuation, typically by a factor of 10 dB, the MAS MDCT coefficients are re-quantized using step sizes derived from the compression information included in the corresponding AAS frame. This quantization yields a mantissa change value for each of the MDCT coefficients in the AAS frame. Implementing these changes to the AAS mantissas in the AAS frame results in the mixing of the MAS audio signal, at a lower volume level, with the AAS audio. The modified AAS frame then becomes the output compressed digital bit stream 1230. In cases in which the AAS has a relatively narrow spectral content, the wider spectral content of the MAS audio signal can be accommodated by adding a pseudo-noise signal to the AAS audio signal prior to compression as shown in FIGS. 14A-B. The pseudo-noise addition causes the encoding process (e.g., which may be carried out via an AC-3 encoder) to allocate more bits to accommodate the wider spectral content of the pseudo-noise signal and, hence, support the spectral content of the MAS audio signal.

While the description of FIG. 13 below is addressed primarily to AC-3 compressed bit streams, the example of FIG. 13, and any of the other examples described herein, can be readily applied to other compression techniques, such as MPEG-AAC. For example, FIG. 13 illustrates, in general, the operations involved in (1) unpacking a MAS compressed bit stream to generate its MDCT coefficients, denoted as $A_{MAS}$, for each MAS "audblk"; (2) unpacking an AAS compressed stream to generate its MDCT coefficients, denoted as $B_{AAS}$, for each AAS "audblk"; (3) attenuating $A_{MAS}$ by a factor $\alpha$ to obtain MDCT coefficients $\alpha A_{MAS}$; (4) combining $B_{AAS}$ and $\alpha A_{MAS}$ by modifying the mantissas of $B_{AAS}$; and (5) repacking and outputting the modified frame.

Turning to FIG. 13, the example process 1300 causes the example mixing device 1200 of FIG. 12 to process an AC-3 frame from the AAS and an AC-3 frame from the MAS in parallel, wherein the AAS corresponds to the compressed auxiliary digital bit stream 1210 and the MAS corresponds to the compressed main digital bit stream 1220. In the case of the AAS, the example process 1300 begins at block 1304 at which the mixing device 1200 acquires a compressed AAS frame from the compressed auxiliary digital bit stream 1210. Then, at block 1308 the mixing device 1200 unpacks the AAS header information included in the compressed AAS frame to determine, for example, the number of audio channels present in the compressed AAS frame. Control proceeds to block 1312 at which the mixing device 1200 resets a counter representative of the number of AAS MDCT coefficient sets in the AAS frame. Next, at block 1316 the mixing device 1200 determines whether all of the MDCT coefficient sets in the frame have been processed, which corresponds to six MDCT coefficient sets in the case of AC-3 encoding.

If at block 1316 the mixing device 1200 determines that not all of the MDCT coefficient sets have been processed (e.g., the counter is not equal to six in the case of AC-3 encoding), control proceeds to blocks 1320 and 1324 at which, for each AAS MDCT coefficient set (or, equivalently, for each AAS "audblk"), the associated mantissas and exponents are unpacked and the coefficient quantization step sizes are determined from the corresponding unpacked exponents. The quantization step size for the mantissa of each AAS MDCT coefficient may be stored, for example, in a data structure within a memory, such as the memory 2030 of FIG. 15. The data structure may also contain the actual bit count from the start of the AAS frame to the location of the particular mantissa in the frame. Additionally or alternatively, information concerning whether the AAS frame corresponds to a long block to a short block may be stored in the data structure.

After processing at blocks 1320 and 1324 completes, control proceeds to block 1328 at which the mixing device 1200 modifies each AAS mantissa in the AAS frame being processed to reflect mixing the AAS frame with the corresponding MAS frame. The processing performed at block 1328 is discussed in greater detail below. After processing at block 1328 completes, control then proceeds to block 1332 at which the mixing device 1200 increments the counter corresponding to the number of AAS MDCT coefficient sets in the AAS frame. Control then returns to block 1316.

In the case of the MAS, which is processed in parallel to the AAS in the example of FIG. 13, the example process 1300 begins at block 1354 at which the mixing device 1200 acquires a compressed MAS frame from the compressed main digital bit stream 1220. Then, at block 1358 the mixing device 1200 unpacks the MAS header information included in the compressed MAS frame to determine, for example, the number of audio channels present in the compressed MAS frame. Control proceeds to block 1362 at which the mixing device 1200 resets a counter representative of the number of MAS MDCT coefficient sets in the MAS frame. Next, at block 1366 the mixing device 1200 determines whether all of the MDCT coefficient sets in the frame have been processed, which corresponds to six MDCT coefficient sets in the case of AC-3 encoding.

If at block 1366 the mixing device 1200 determines that not all of the MAS MDCT coefficient sets have been processed (e.g., the counter is not equal to six in the case of AC-3 encoding), control proceeds to blocks 1370 at which the MAS frame is unpacked to generate a set of MAS MDCT coefficients corresponding to each MAS MDCT coefficient set (or, equivalently, each MAS "audblk"). Control then proceeds to block 1374 at which the MAS MDCT coefficients are attenuated by an attenuation factor, such as a factor between 3 and 10 dB. Control proceeds to block 1378 at which a mantissa is determined for each attenuated MAS MDCT coefficient by dividing the mantissa value by the appropriate quantization step size determined at block 1320 and associated with the corresponding frequency index in the AAS stream. These quantized attenuated MAS mantissas are used at block 1328 to modify the corresponding AAS mantissas to reflect the mixing of the MAS frame with the AAS frame. After processing at block 1378 completes, control then proceeds to block 1382 at which the mixing device 1200 increments the counter corresponding to the number of MAS MDCT coefficient sets in the MAS frame. Control then returns to block 1366.

If, however, at blocks 1316 and 1366 the mixing device 1200 determines, respectively, that all AAS MDCT coefficients and MAS MDCT coefficients for the acquired AAS and MAS frames have been processed, control then proceeds to block 1390 at which the mixing device 120 repacks the modified AAS MDCT coefficients to form the mixed AC-3 audio frame. Control then proceeds to block 1394 at which the mixing device 1200 outputs the mixed AC-3 audio frame for inclusion in the compressed mixed digital bit stream 1230.

To better understand the processing performed by the example process 1300 of FIG. 13, consider an example operation in which an AAS MDCT coefficient at block 1328 is represented with 4 bits, resulting in a 15-level quantization of the mantissa in the range −1.0 to 1.0. Suppose for purposes of this example that the AAS MDCT coefficient has an original mantissa value of −4.0/15=−0.2666. Then, according to the example AC-3 quantization look-up table 600 shown in FIG. 6, the bit pattern corresponding to the original AAS mantissa is 0101 (decimal 5). Next, assume for purposes of this example that the attenuated MAS mantissa value determined at block 1378 is equal to −0.1634. This attenuated MAS mantissa value causes a corresponding change to the AAS mantissa, resulting in an intermediate (raw) modified AAS mantissa value equal to −0.4300 being determined at block 1328, which lies between the quantization values of −8/15=−0.5333 and −6/15=−0.4 in the quantization look-up table 600. The value −6/15 is closest to the intermediate modified AAS mantissa value of −0.4300 and, thus, at block 1328 the bit pattern 0100 (decimal 4) is selected to replace the original code used to represent the original AAS mantissa to generate the resulting mixed MDCT coefficient In the preceding example, if the intermediate modified mantissa value determined at block 1328 lies outside the range of selectable mantissa values (e.g., is outside the range of ±14/15 in the quantization table 600), the mantissa output by block 1328 is represented by the bit pattern corresponding to the positive or negative limit of the selectable mantissa values, as appropriate. Alternatively, the exponent could be changed to result in a smaller required mantissa value, but such an exponent change is undesirable as it would require the entire encoding/compression algorithm, including the mask computation, to be repeated. Furthermore, any error arising from restricting the mixed mantissa values to be within permissible upper and lower limits is likely to have a negligible effect on the audio quality of the MAS. Specifically, in voice-over mixing, because the audio level of the MAS is attenuated to a relatively low value, the error due to the imposed limits on mantissa value changes typically has a relatively negligible impact on audio quality.

In some cases, the AAS is predominantly a speech signal having a spectral range confined primarily to the lower frequency bands and, thus, may use relatively few bits to represent higher frequency components. In such circumstances, a MAS that is, for example, predominantly music and rich in higher frequency spectral content may suffer a loss of higher frequency spectral energy due to the quantization process employed by the AAS. FIGS. 14A-B illustrate enhancements 1400 and 1450, respectively, that may be used to artificially enhance the spectral fidelity of the AAS audio by mixing known pseudo-white noise with the time-domain AAS signal prior to compression. As a result of the added pseudo-white noise, the AC-3 encoder will assign more mantissa bits over a broader spectral range which may be used to represent the higher spectral content of the MAS audio and, thereby, reduce the impact on audio quality. During the mixing process, the effect of the known pseudo-white noise can be eliminated via an appropriate subtraction process.

Turning to FIG. 14A, the process 1400 operates on the time-domain AAS signal and begins at block 1404 at which the process 1400 determines pseudo-noise time-domain samples to be added to the time-domain AAS signal. The pseudo-noise samples may be generated by the process 1400 based on any well-known pseudo-noise generation algorithm, or generated beforehand, stored in a memory (e.g., memory 2030 of FIG. 15) and read from the memory by the process 1400. The pseudo-noise samples may be generated to possess a spectral characteristic having a wider spectral range than the time-domain AAS signal being processed by the process 1400. Next, at block 1408 the process 1400 adds the pseudo-noise time-domain samples to the AAS time-domain samples. Finally, control proceeds to block 1412 at which the process 1400 compresses the time-domain signal resulting from adding the pseudo-noise time-domain samples to the original AAS time-domain signal. The process 1400 terminates after all AAS time-domain samples have been processed.

Turning to FIG. 14B, an enhancement to the example process 1300 of FIG. 13 is illustrated as a block 1450 to be executed between blocks 1374 and 1378 of process 1300. Block 1450 is intended to undo the effects of adding the pseudo-noise time-domain samples at block 1408 of the example process 1400 of FIG. 14A. In FIG. 14B, control of process 1300 proceeds to block 1450 after the MAS MDCT coefficients have been attenuated at block 1374. At block 1450, the effect of the pseudo-noise samples is subtracted from the attenuated MAS MDCT coefficients to allow the pseudo-noise to be removed as part of the mixing process implemented by blocks 1378 and 1328 of process 1300. A person of ordinary skill in the art will appreciate that the effect of the pseudo-noise samples may be subtracted from the attenuated MAS MDCT coefficients in many ways. In one example, the known pseudo-noise time-domain samples may be stored in the mixing device 1200 of FIG. 12 such that the mixing device may MDCT transform appropriately time-aligned pseudo-noise samples to generate pseudo-noise MDCT coefficients to subtract from the attenuated MAS MDCT coefficients. In another example, the mixing device 1220 may store a set of average pseudo-noise MDCT coefficients corresponding to the average spectral characteristic of the pseudo-noise samples, thereby alleviating the need to calculate the pseudo-noise MDCT coefficients in real-time or achieve time-alignment to select the appropriate pseudo-noise samples for MDCT transformation. In any case, after the effects of the pseudo-noise samples are subtracted from the MAS MDCT coefficients at block 1450, control proceeds to block 1378 and blocks subsequent thereto to implement the mixing process described above in connection with FIG. 13.

Figure 15:
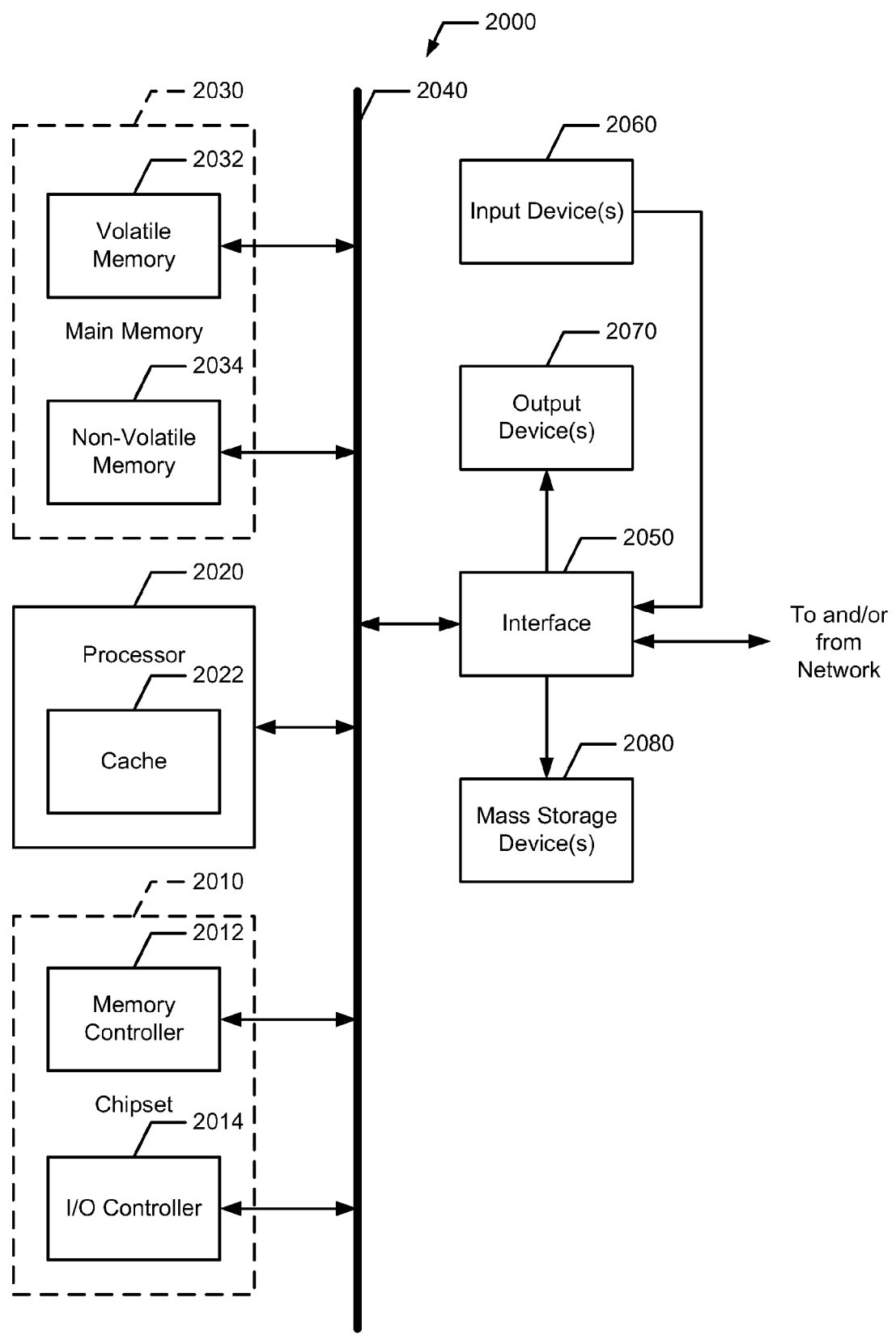
FIG. 15 is a block diagram of an example processor system that may be used to implement the example mixing device of FIG. 2.

FIG. 15 is a block diagram of an example processor system 2000 that may used to implement the methods and apparatus disclosed herein. The processor system 2000 may be a desktop computer, a laptop computer, a notebook computer, a personal digital assistant (PDA), a server, an Internet appliance or any other type of computing device.

The processor system 2000 illustrated in FIG. 15 includes a chipset 2010, which includes a memory controller 2012 and an input/output (I/O) controller 2014. As is well known, a chipset typically provides memory and I/O management functions, as well as a plurality of general purpose and/or special purpose registers, timers, etc. that are accessible or used by a processor 2020. The processor 2020 is implemented using one or more processors. In the alternative, other processing technology may be used to implement the processor 2020. The processor 2020 includes a cache 2022, which may be implemented using a first-level unified cache (L1), a second-level unified cache (L2), a third-level unified cache (L3), and/or any other suitable structures to store data.

As is conventional, the memory controller 2012 performs functions that enable the processor 2020 to access and communicate with a main memory 2030 including a volatile memory 2032 and a non-volatile memory 2034 via a bus 2040. The volatile memory 2032 may be implemented by Synchronous Dynamic Random Access Memory (SDRAM), Dynamic Random Access Memory (DRAM), RAMBUS Dynamic Random Access Memory (RDRAM), and/or any other type of random access memory device. The non-volatile memory 2034 may be implemented using flash memory, Read Only Memory (ROM), Electrically Erasable Programmable Read Only Memory (EEPROM), and/or any other desired type of memory device.

The processor system 2000 also includes an interface circuit 2050 that is coupled to the bus 2040. The interface circuit 2050 may be implemented using any type of well known interface standard such as an Ethernet interface, a universal serial bus (USB), a third generation input/output interface (3GIO) interface, and/or any other suitable type of interface.

One or more input devices 2060 are connected to the interface circuit 2050. The input device(s) 2060 permit a user to enter data and commands into the processor 2020. For example, the input device(s) 2060 may be implemented by a keyboard, a mouse, a touch-sensitive display, a track pad, a track ball, an isopoint, and/or a voice recognition system.

One or more output devices 2070 are also connected to the interface circuit 2050. For example, the output device(s) 2070 may be implemented by media presentation devices (e.g., a light emitting display (LED), a liquid crystal display (LCD), a cathode ray tube (CRT) display, a printer and/or speakers). The interface circuit 2050, thus, typically includes, among other things, a graphics driver card.

The processor system 2000 also includes one or more mass storage devices 2080 to store software and data. Examples of such mass storage device(s) 2080 include floppy disks and drives, hard disk drives, compact disks and drives, and digital versatile disks (DVD) and drives.

The interface circuit 2050 also includes a communication device such as a modem or a network interface card to facilitate exchange of data with external computers via a network. The communication link between the processor system 2000 and the network may be any type of network connection such as an Ethernet connection, a digital subscriber line (DSL), a telephone line, a cellular telephone system, a coaxial cable, etc.

Access to the input device(s) 2060, the output device(s) 2070, the mass storage device(s) 2080 and/or the network is typically controlled by the I/O controller 2014 in a conventional manner. In particular, the I/O controller 2014 performs functions that enable the processor 2020 to communicate with the input device(s) 2060, the output device(s) 2070, the mass storage device(s) 2080 and/or the network via the bus 2040 and the interface circuit 2050.

While the components shown in FIG. 15 are depicted as separate blocks within the processor system 2000, the functions performed by some of these blocks may be integrated within a single semiconductor circuit or may be implemented using two or more separate integrated circuits. For example, although the memory controller 2012 and the I/O controller 2014 are depicted as separate blocks within the chipset 2010, the memory controller 2012 and the I/O controller 2014 may be integrated within a single semiconductor circuit.

The methods and apparatus disclosed herein are particularly well suited for use with digital bit streams implemented in accordance with the AC-3 standard. However, the methods and apparatus disclosed herein may be applied to other digital audio coding techniques.

In addition, while this disclosure is made with respect to example television and radio broadcast systems, it should be understood that the disclosed system is readily applicable to many other media systems. Accordingly, while this disclosure describes example systems and processes, the disclosed examples are not the only way to implement such systems.

Although certain example methods, apparatus, and articles of manufacture have been described herein, the scope of coverage of this patent is not limited thereto. On the contrary, this patent covers all methods, apparatus, and articles of manufacture fairly falling within the scope of the appended claims either literally or under the doctrine of equivalents. For example, although this disclosure describes example systems including, among other components, software executed on hardware, it should be noted that such systems are merely illustrative and should not be considered as limiting. In particular, it is contemplated that any or all of the disclosed hardware and software components could be embodied exclusively in dedicated hardware, exclusively in firmware, exclusively in software or in some combination of hardware, firmware, and/or software.

What is claimed is:

1. A method to mix data streams, the method comprising:
obtaining a first set of transform coefficients from a first compressed data stream, the first set of transform coefficients including a first set of mantissa codes and a first set of exponents;
determining a second set of mantissa codes based on the first set of transform coefficients and a second data stream;
replacing the first set of mantissa codes in the first set of transform coefficients with the second set of mantissa codes, without replacing the first set of exponents in the first set of transform coefficients, to mix the second data stream with the first compressed data stream to form a third data stream without uncompressing the first compressed data stream; and
at least one of transmitting or storing the third data stream.

2. A method as defined in claim 1, wherein the first compressed data stream is compressed according to an audio compression standard, and the second data stream is an uncompressed audio data stream.

3. A method as defined in claim 1, wherein determining the second set of mantissa codes includes:
determining a set of mantissa values based on the first set of transform coefficients and the second data stream; and
processing the set of mantissa values based on compression information obtained from the first compressed data stream to determine the second set of mantissa codes.

4. A method as defined in claim 3, wherein determining the set of mantissa values includes:
processing the first set of transform coefficients to determine first time domain data;
combining second time domain data from the second data stream with the first time domain data to determine third time domain data; and
processing the third time domain data to determine the set of mantissa values.

5. A method as defined in claim 3, wherein processing the set of mantissa values includes quantizing the set of mantissa values based on the compression information to determine the second set of mantissa codes.

6. A method as defined in claim 5, wherein the compression information includes a quantization step size.

7. A method as defined in claim 5, wherein quantizing the set of mantissa values includes setting a first one of the second set of mantissa codes to at least one of a positive limit or a negative limit when a first one of the set of mantissa values corresponding to the first one of the second set of mantissa codes is outside a range of mantissa values determined from the compression information.

8. A tangible computer readable storage memory device or storage disk comprising computer readable instructions which, when executed, cause a computing device to at least:
obtain a first set of transform coefficients from a first compressed data stream, the first set of transform coefficients including a first set of mantissa codes and a first set of exponents;
determine a second set of mantissa codes based on the first set of transform coefficients and a second data stream; and
replace the first set of mantissa codes in the first set of transform coefficients with the second set of mantissa codes, without replacing the first set of exponents in the first set of transform coefficients, to mix the second data stream with the first compressed data stream without uncompressing the first compressed data stream.

9. A memory device or storage disk as defined in claim 8, wherein the first compressed data stream is compressed according to an audio compression standard, and the second data stream is an uncompressed audio data stream.

10. A memory device or storage disk as defined in claim 8, wherein to determine the second set of mantissa codes, the instructions, when executed, further cause the computing device to:
   determine a set of mantissa values based on the first set of transform coefficients and the second data stream; and
   process the set of mantissa values based on compression information obtained from the first compressed data stream to determine the second set of mantissa codes.

11. A memory device or storage disk as defined in claim 10, wherein to determine the set of mantissa values, the instructions, when executed, further cause the computing device to:
   process the first set of transform coefficients to determine first time domain data;
   combine second time domain data from the second data stream with the first time domain data to determine third time domain data; and
   process the third time domain data to determine the set of mantissa values.

12. A memory device or storage disk as defined in claim 10, wherein to process the set of mantissa values, the instructions, when executed, further cause the computing device to quantize the set of mantissa values based on the compression information to determine the second set of mantissa codes.

13. A memory device or storage disk as defined in claim 12, wherein the compression information includes a quantization step size.

14. A memory device or storage disk as defined in claim 12, wherein to quantize the set of mantissa values, the instructions, when executed, further cause the computing device to set a first one of the second set of mantissa codes to at least one of a positive limit or a negative limit when a first one of the set of mantissa values corresponding to the first one of the second set of mantissa codes is outside a range of mantissa values determined from the compression information.

15. An apparatus to mix data streams, the apparatus comprising:
   an unpacking unit to obtain a first set of transform coefficients from a first compressed data stream, the first set of transform coefficients including a first set of mantissa codes and a first set of exponents; and
   a modification unit to:
      determine a second set of mantissa codes based on the first set of transform coefficients and a second data stream; and
      replace the first set of mantissa codes in the first set of transform coefficients with the second set of mantissa codes, without replacing the first set of exponents in the first set of transform coefficients, to mix the second data stream with the first compressed data stream to form a third data stream without uncompressing the first compressed data stream; and
   a repacking unit to output the third data stream to at least one of a transmitter or memory.

16. An apparatus as defined in claim 15, wherein the first compressed data stream is compressed according to an audio compression standard, and the second data stream is an uncompressed audio data stream.

17. An apparatus as defined in claim 15, wherein to determine the second set of mantissa codes, the modification unit is further to:
   determine a set of mantissa values based on the first set of transform coefficients and the second data stream; and
   process the set of mantissa values based on compression information obtained from the first compressed data stream to determine the second set of mantissa codes.

18. An apparatus as defined in claim 17, wherein to determine the set of mantissa values, the modification unit is further to:
   process the first set of transform coefficients to determine first time domain data;
   combine second time domain data from the second data stream with the first time domain data to determine third time domain data; and
   process the third time domain data to determine the set of mantissa values.

19. An apparatus as defined in claim 17, wherein to process the set of mantissa values, the modification unit is further to quantize the set of mantissa values based on the compression information to determine the second set of mantissa codes.

20. An apparatus as defined in claim 19, wherein the compression information includes a quantization step size.

21. An apparatus as defined in claim 19, wherein to quantize the set of mantissa values, the modification unit is further to set a first one of the second set of mantissa codes to at least one of a positive limit or a negative limit when a first one of the set of mantissa values corresponding to the first one of the second set of mantissa codes is outside a range of mantissa values determined from the compression information.

* * * * *